US010545276B2

(12) United States Patent
Isbrucker et al.

(10) Patent No.: US 10,545,276 B2
(45) Date of Patent: Jan. 28, 2020

(54) STACK LIGHTER LUMINAIRE

(71) Applicant: Quarkstar LLC, Las Vegas, NV (US)

(72) Inventors: Victor E. Isbrucker, Sturgeon Point (CA); Ingo Speier, Saanichton (CA)

(73) Assignee: Quarkstar LLC, Las Vegas, NV (US)

( * ) Notice: Subject to any disclaimer, the term of this patent is extended or adjusted under 35 U.S.C. 154(b) by 211 days.

(21) Appl. No.: 15/525,032

(22) PCT Filed: Nov. 6, 2015

(86) PCT No.: PCT/US2015/059513
§ 371 (c)(1),
(2) Date: May 5, 2017

(87) PCT Pub. No.: WO2016/073878
PCT Pub. Date: May 12, 2016

(65) Prior Publication Data
US 2019/0101686 A1    Apr. 4, 2019

Related U.S. Application Data

(60) Provisional application No. 62/077,151, filed on Nov. 7, 2014.

(51) Int. Cl.
*F21V 8/00* (2006.01)
*F21V 7/00* (2006.01)
(Continued)

(52) U.S. Cl.
CPC ............ *G02B 6/0045* (2013.01); *F21S 8/026* (2013.01); *F21V 7/0016* (2013.01);
(Continued)

(58) Field of Classification Search
CPC .... F21S 8/00; F21S 8/026; F21V 5/04; F21V 7/0025; F21V 7/0033; F21V 7/0091;
(Continued)

(56) References Cited

U.S. PATENT DOCUMENTS 5,530,628 A    6/1996  Ngai
5,581,683 A    12/1996 Bertignoll et al.
(Continued)

FOREIGN PATENT DOCUMENTS

CN       1818459 A       8/2006
DE   102012107437 A1     6/2014
(Continued)

OTHER PUBLICATIONS

European Application No. 15 802 235.0, Communication pursuant to Article 94(3) EPC, dated Jun. 22, 2018, 9 pages.
(Continued)

*Primary Examiner* — Peggy A Neils
(74) *Attorney, Agent, or Firm* — Fish & Richardson P.C.

(57) ABSTRACT

A luminaire module including a plurality of light-emitting elements (LEEs) arranged to emit light in a forward direction; a light guide comprising a pair of opposing side surfaces extending from a receiving end of the light guide to an opposing end of the light guide, the light guide configured to guide light received at the receiving end from the LEEs in the forward direction to the opposing end, wherein the light guide is elongated along a transverse direction orthogonal to the forward direction; and an optical extractor elongated along the transverse direction and located at the opposing end of the light guide to receive the guided light, the optical extractor comprising a redirecting surface and an output surface, wherein the received light undergoes two reflections off the redirecting surface prior to being output through the output surface in an ambient environment as output light in a backward angular range.

28 Claims, 22 Drawing Sheets

(51) Int. Cl.
*F21S 8/02* (2006.01)
*F21S 8/00* (2006.01)
*F21W 131/301* (2006.01)
*F21Y 103/10* (2016.01)
*F21Y 115/10* (2016.01)

(52) U.S. Cl.
CPC .......... *F21V 7/0025* (2013.01); *F21V 7/0033* (2013.01); *F21V 7/0091* (2013.01); *G02B 6/0018* (2013.01); *G02B 6/0028* (2013.01); *G02B 6/0073* (2013.01); *F21Y 2115/10* (2016.08)

(58) Field of Classification Search
CPC .......... F21W 2131/301; F21Y 2103/10; F21Y 2115/10; G02B 6/00; G02B 6/0073; G02B 6/005
See application file for complete search history.

(56) References Cited

U.S. PATENT DOCUMENTS

| | | | | |
|---|---|---|---|---|
| 7,740,366 | B2* | 6/2010 | Tetsuo | F21V 5/04 362/97.1 |
| 7,942,565 | B2* | 5/2011 | Klick | G02B 6/0018 362/555 |
| 8,556,456 | B2* | 10/2013 | Boonekamp | G02B 6/0008 362/231 |
| 9,746,596 | B2* | 8/2017 | Preston | G02B 6/0008 |
| 9,766,385 | B2* | 9/2017 | Boonekamp | G02B 6/0001 |
| 10,209,429 | B2* | 2/2019 | van de Ven | G02B 6/0021 |
| 2006/0221613 | A1* | 10/2006 | Coushaine | F21K 9/00 362/249.01 |
| 2006/0250814 | A1* | 11/2006 | Tabor | G02B 6/0006 362/551 |
| 2008/0204888 | A1 | 8/2008 | Kan et al. | |
| 2009/0201698 | A1 | 8/2009 | Klick et al. | |
| 2012/0140461 | A1 | 6/2012 | Pickard | |
| 2013/0039050 | A1 | 2/2013 | Dau | |
| 2013/0063962 | A1 | 3/2013 | Huang | |
| 2013/0208457 | A1 | 8/2013 | Durkee | |
| 2013/0258699 | A1 | 10/2013 | Weaver | |
| 2014/0126235 | A1 | 5/2014 | Speier et al. | |
| 2014/0160779 | A1 | 6/2014 | Pusch et al. | |
| 2014/0211496 | A1 | 7/2014 | Durkee | |

FOREIGN PATENT DOCUMENTS

| | | |
|---|---|---|
| DE | 102013211868 A1 | 12/2014 |
| EP | 1744096 A1 | 1/2007 |
| EP | 2161494 A1 | 3/2010 |
| EP | 2327340 A1 | 6/2011 |
| EP | 2778512 A1 | 9/2014 |
| EP | 2886937 A1 | 6/2015 |
| FR | 2934353 A1 | 1/2010 |
| JP | 2014229510 A | 12/2014 |
| WO | WO2008017968 A1 | 2/2008 |
| WO | WO2012059852 A1 | 5/2012 |
| WO | WO2012105314 A1 | 8/2012 |
| WO | WO2013023008 A1 | 2/2013 |
| WO | WO2014124229 A1 | 8/2014 |
| WO | WO2015113979 A1 | 8/2015 |

OTHER PUBLICATIONS

International Application No. PCT/US2015/059513, Notification of Transmittal of the International Search Report and the Written Opinion of the International Searching Authority, dated Mar. 31, 2016, 21 pages.

International Application No. PCT/US2015/059596, Notification of Transmittal of the International Search Report and the Written Opinion of the International Searching Authority, dated Jan. 25, 2016, 21 pages.

European Patent Application No. 15 802 239.2, Communication pursuant to Article 94(3) EPC, dated May 4, 2018, 44 pages.

* cited by examiner

STACK LIGHTER LUMINAIRE

CROSS-REFERENCE TO RELATED APPLICATIONS

This application claims benefit under 35 U.S.C. § 119(e)(1) of U.S. Provisional Application No. 62/077,151, filed on Nov. 7, 2014, incorporated by reference herein.

TECHNICAL FIELD

The present disclosure relates generally to luminaire modules for illuminating target surfaces typically in a slightly grazing to grazing configuration, for example to stack lighter luminaires or wall washer luminaires including solid state-based light guide illumination devices.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

The present disclosure relates to stack lighter luminaires that include a solid state-based light guide illumination device.

In general, innovative aspects of the technologies described herein can be implemented in an illumination device that includes one or more of the following aspects:

In a first aspect, a luminaire module includes a plurality of light-emitting elements (LEEs) arranged to emit light in a forward direction; a light guide including a pair of opposing side surfaces extending from a receiving end of the light guide to an opposing end of the light guide, the light guide configured to guide light received at the receiving end from the LEEs in the forward direction to the opposing end, where the light guide is elongated along a transverse direction orthogonal to the forward direction; and an optical extractor elongated along the transverse direction and located at the opposing end of the light guide to receive the guided light, the optical extractor including a redirecting surface and an output surface, where the received light undergoes two reflections off the redirecting surface prior to being output through the output surface in an ambient environment as output light in a backward angular range.

The foregoing and other embodiments can each optionally include one or more of the following features, alone or in combination. In some implementations, the output surface can be convex, and the redirecting surface of the optical extractor can include a first reflective surface where the light received by the optical extractor undergoes a first of the two reflections and a second reflective surface where the light that underwent the first of the two reflections undergoes a second of the two reflections. Further, the output surface can be a diffusive surface. In some cases the first reflective surface can be convex, and in other cases the first reflective surface can be flat. In either of these cases the second reflective surface can be convex, flat or concave.

In some implementations, the optical extractor is formed from a first solid material. Further, the light guide is formed from a second solid material. Here, the first solid material can be the same as the second solid material, and the optical extractor and the light guide are integrally formed. Also here, the optical extractor and the light guide can be bonded together.

In any of the above implementations, the redirecting surface and the output surface can be shaped and arranged such that the luminaire module provides illumination on a target surface that is laterally spaced-apart from the optical extractor and is encompassed by the backward angular range, and a ratio of maximum illumination to minimum illumination on the target surface over 1 m along the dimension of the target surface parallel to the forward direction is at most 4:1. In any of the above implementations, the redirecting surface and the output surface can be shaped and arranged such that the luminaire module provides illumination on a target surface that is laterally spaced-apart from the optical extractor and is encompassed by the backward angular range, and a ratio of maximum illumination to minimum illumination on the target surface over 2 m along the dimension of the target surface parallel to the forward direction is at most 10:1.

In some implementations, the redirecting surface and the output surface can be shaped and arranged such that a prevalent direction of light propagation within the backward angular range has a component antiparallel to the forward direction and a component orthogonal to the forward direction.

In some implementations, the luminaire module can further include one or more optical couplers. Here, the light provided by the LEEs is in a first angular range, the optical couplers are arranged to receive the light provided by the LEEs and redirect it to the receiving end of the light guide in a second angular range, and a numerical aperture of the light guide is such that the light received from the optical couplers in the second angular range can be guided by the light guide through TIR off the pair of opposing side surfaces. In some implementations, the LEEs can be LEDs that emit white light. In some implementations, the luminaire module can be elongated along a direction orthogonal to the forward direction. In some implementations, the luminaire module can have a toroidal shape about an axis parallel to the forward direction.

In some aspects, illumination devices can include one or more of the above luminaire modules. In some implementations, these illumination devices can be configured to operate as a stack lighter luminaire or as a wall wash luminaire. Moreover, one of these illumination devices can include multiple of the luminaire modules arranged to form an open or closed torus about an axis parallel to the forward direction.

In another aspect, a light shaping optical article includes a solid optic having a cross-sectional profile including an input surface; an output surface opposite the input interface; a first reflective surface; and a second reflective surface extending between the first reflective surface and the output surface, the first reflective surface extending between the second reflective surface and the input surface. Here, the first reflective surface, the second reflective surface and the output surface are shaped and arranged such that, when the solid optic receives light at the input surface having an input angular range in a plane of the cross-sectional profile, the received light undergoes a first reflection off the first reflective surface, the light reflected off the first reflective surface undergoes a second reflection off the second reflective surface, and the light reflected off the second reflective surface exits the solid optic through the output surface in an output angular range in the plane, where a prevalent propagation direction of output light in the output angular range is tilted in a backward direction relative to a prevalent propagation direction of input light in the input angular range. Additionally, the solid optic has an elongate extension extending from the plane of the cross-sectional profile.

The foregoing and other embodiments can each optionally include one or more of the following features, alone or in combination. In some implementations, the output surface can include a diffusion pattern. In some implementations, the light shaping optical article can further include a diffusive film attached to the output surface. In some implementations, the solid optic can include plastic material.

In some implementations, a dimension of the solid optics along the prevalent propagation direction of the light in the input angular range can be less than 25 mm. In some implementations, a dimension of the solid optic in the cross-sectional profile orthogonal to the prevalent propagation direction of the light in the input angular range can be less than 40 mm. In some implementations, the first reflective surface can be convex or flat. In either of these cases, the second reflective surface can be convex, flat or concave.

In some implementations, the first reflective surface, the second reflective surface and the output surface can be shaped and arranged such that the light shaping optical article provides illumination on a target surface that is laterally spaced-apart from the solid optic and is encompassed by the output angular range, and a ratio of maximum illumination to minimum illumination on the target surface over 1 m along the dimension of the target surface parallel to the forward direction is at most 4:1. In some implementations, the first reflective surface, the second reflective surface and the output surface can be shaped and arranged such that the light shaping optical article provides illumination on a target surface that is laterally spaced-apart from the solid optic and is encompassed by the output angular range, and a ratio of maximum illumination to minimum illumination on the target surface over 2 m along the dimension of the target surface parallel to the prevalent propagation direction in the input angular range is at most 10:1.

In some implementations, the first reflective surface, the second reflective surface and the output surface can be shaped and arranged such that the prevalent propagation direction in the output angular range has a component antiparallel to the prevalent propagation direction in the input angular range and a component orthogonal to the prevalent propagation direction in the input angular range. In some implementations, the first reflective surface, the second reflective surface and the output surface can be shaped and arranged such that a tilt angle between the prevalent propagation direction in the input range and the prevalent direction in the output angular range is larger than 5° and smaller than 20°.

The illumination devices described in this specification may be configured to use light flux originating from one or more primary solid state light sources of known dimensional, geometric, brightness and uniformity characteristics, and a secondary reflector/refractor/combination optic to output a specified radiation pattern. The secondary optic can redistribute the source flux's "phase-space" to a new phase-space of prescribed dimensional extent and angular divergence (e.g., directional cosines) while maintaining a substantially uniform intensity from the secondary optic. The disclosed illumination devices can provide uniform illumination of a target surface and efficient energy conversion from the primary solid state light sources of the illumination devices to the target surface. Some illumination devices can provide uniform and/or glare-free intensity when viewed directly from one or more locations. Additionally, the disclosed illumination devices can provide glare-free intensity characteristics while maintaining efficiency and directionality in flux redirection.

The details of one or more implementations of the technologies described herein are set forth in the accompanying drawings and the description below. Other features, aspects, and advantages of the disclosed technologies will become apparent from the description, the drawings, and the claims.

Figure 1A:
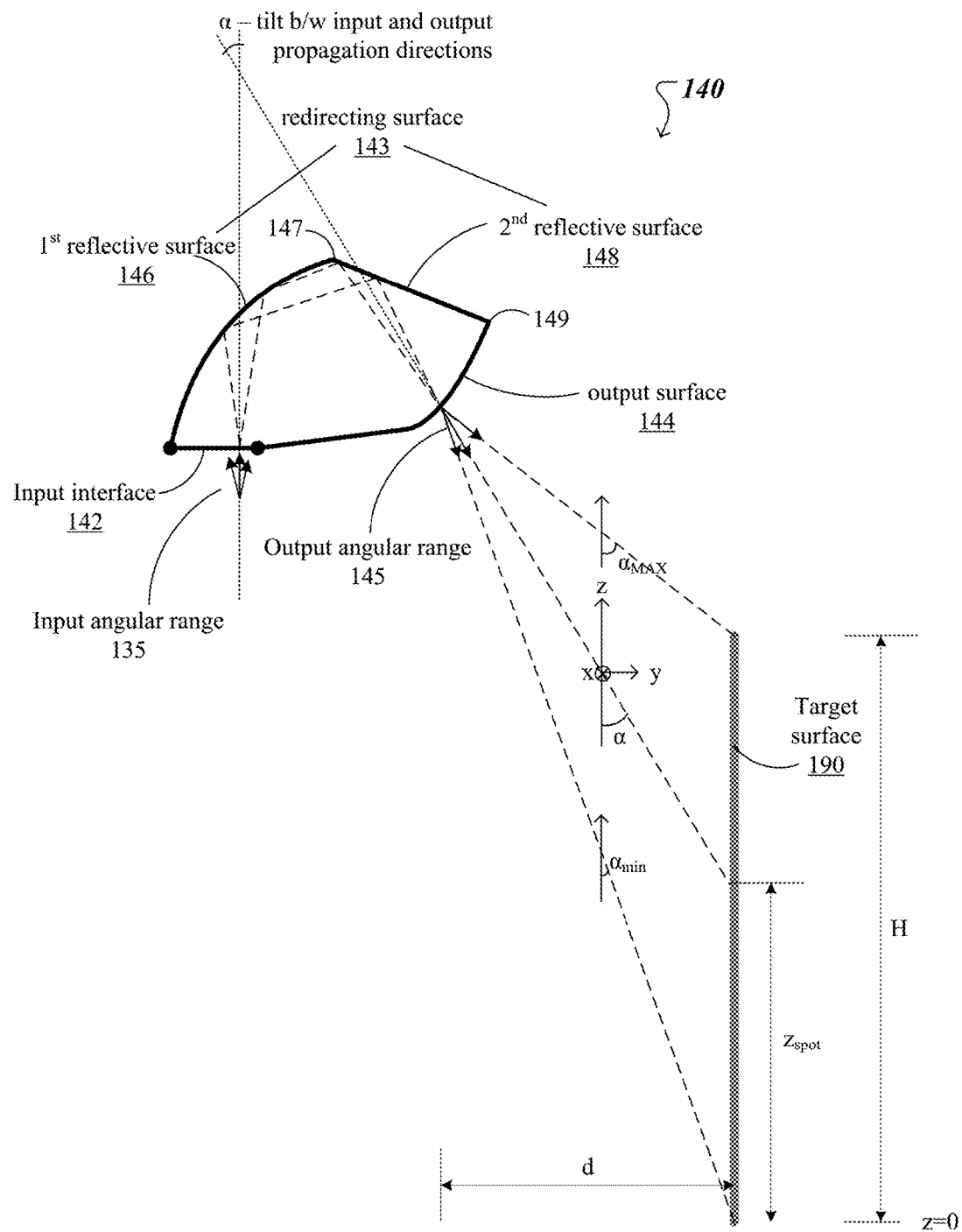
FIGS. 1A-1C show aspects of an example of a light shaping optical article to be used as a component of a stack lighter luminaire.

Reference numbers and designations in the various drawings indicate exemplary aspects, implementations of particular features of the present disclosure.

DETAILED DESCRIPTION

The present disclosure relates to luminaires, also referred to as illumination devices, for providing stack/shelving illumination and/or wall washing. The disclosed illumination devices can efficiently guide and distribute light emitted by solid-state light sources towards target surfaces, e.g., towards shelf stacks, panels, walls or other target surfaces, to uniformly illuminate the target surfaces. Target surfaces can have vertical, horizontal or other arrangements. With respect to illumination the term uniformity is intended to refer to constraining the maximum-to-minimum ratio (MMR) of the illuminance caused by the luminaire on a portion of the target surface of a specified length. For example, illuminance provided on a target surface over 1 m by some of the disclosed luminaires can have an MMR that is lower than 5:1, 4:1 or 3:1. As another example, illuminance provided on a target surface over 2 m by the disclosed luminaires can have the MMR that is lower than 20:1, 15:1 or 10:1.

A light shaping optical article is disclosed that is configured to provide light in an output angular range that is tilted relative to a prevalent direction of propagation of light in an input angular range and distributed to illuminate a defined target surface within a predetermined MMR. As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum. For example, the prevalent direction of propagation associated with the angular range can be an orientation of a lobe of the (angular) intensity distribution. (See, e.g., FIG. 1C.) Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 50%, 10%, 5%, 1%, or other values, depending on the lighting application. Moreover, the disclosed light shaping optical article is configured to output light in the form of a virtual filament. The curved profiles of the disclosed light shaping optical article are smooth and gradual to ease the surface slope tolerances for the fabrication process.

The disclosed light shaping optical article can be used in a light guide luminaire module (also referred to simply as a luminaire module), such that light in the input angular range is emitted by solid-state light sources and guided by a light guide of the light guide luminaire module to an input aperture of the light shaping optical article. A stack lighter luminaire is an illumination device configured to illuminate library stacks. The stack lighter luminaire can be used to function as a wall-wash to illuminate a wall or for other illumination applications. As such, a disclosed illumination device that includes one or more of the foregoing light guide luminaire modules can be suspended adjacent to, or can be disposed in a recession of, a ceiling at a desired distance from a target stack shelving to operate as a stack lighter luminaire or a target wall to operate as a wall wash luminaire. Efficiency of the disclosed illumination devices, defined as the fraction of the light emitted by the solid-state light sources provided to the target surface, can reach 90%.

(i) Light Shaping Optical Article

FIG. 1A illustrates a block diagram of a light shaping optical article 140 configured to transform, for example to tilt, by a tilt angle α≠0, a prevalent propagation direction of light in an output angular range 145 located substantially on one side of the light shaping optical article 140 relative to a prevalent propagation direction of light in an input angular range 135. Here, a reference system (x,y,z) has a z-axis aligned to the prevalent propagation direction of light in input angular range 135. In the example shown in FIG. 1A, a target surface 190 also is aligned parallel to the z-axis. However, the prevalent propagation direction of light in input angular range 135 can, but does not have to, be parallel to the target surface 190.

The light shaping optical article 140 is formed from a solid, transparent material (with n>1). For example, the solid, transparent material can be glass with a refractive index of about 1.5. As another example, the solid, transparent material can be a plastic with a refractive index of about 1.4-1.6.

The light shaping optical article 140 includes an input surface 142 through which input light with the input angular range 135 enters into the light shaping optical article 140, and an output surface 144 through which output light with the output angular range 145 exits from the light shaping optical article 140. The output surface 144 has positive curvature, i.e., it is convex. Further, the light shaping optical article 140 has a reflective surface 146 arranged and configured to cause light received through the input surface 142 in the input angular range 135 to undergo two reflections off the redirecting surface prior to being output through the output surface 144 in the output angular range 145 to an ambient environment. In the example illustrated in FIG. 1A, the light shaping optical article 140 is asymmetric with respect to the z-axis and the redirecting surface 143 extends from the input interface 142 to the output interface 144. Moreover, the redirecting surface 143 includes a first reflective surface 146 where the light received by the light shaping optical article 140 undergoes a first of the two reflections and a second reflective surface 148 where the light that underwent the first of the two reflections undergoes a second of the two reflections. The foregoing first and second reflections are illustrate by the ray diagram of FIG. 1A in which rays are represented in long-dashed lines, and the divergence of the input angular range 135 is indicated using rays emanating from points of input surface 142.

Further in the example illustrated in FIG. 1A, a cross-section of the redirecting surface 143 in the y-z plane has a vertex 147 at the intersection of the first reflective surface 146 and the second reflective surface 148. Furthermore, the second reflective surface 148 intersects the output surface 144 at edge 149.

The first reflective surface 146 can have zero or positive curvature (i.e., the first reflective surface 146 is flat or convex), and the second reflective surface 148 can have negative, zero or positive curvature (i.e., the second reflective surface 148 is concave, flat or convex). Moreover, respective values of the curvature of the first reflective surface 146, the second reflective surface 148 and the output surface 144 are configured such that the prevalent propagation direction of light in output angular range 145 is tilted by the tilt angle α relative to prevalent propagation direction of light in the input angular range 135, such that while the prevalent propagation direction of light in the input angular range 135 is, or has a component, parallel to the z-axis, the prevalent propagation direction of light in the output angular range 145 has a component antiparallel to the z-axis. In this manner, α is a tilt of the prevalent propagation direction of output angular range 145 relative to the z-axis.

Figure 1B:
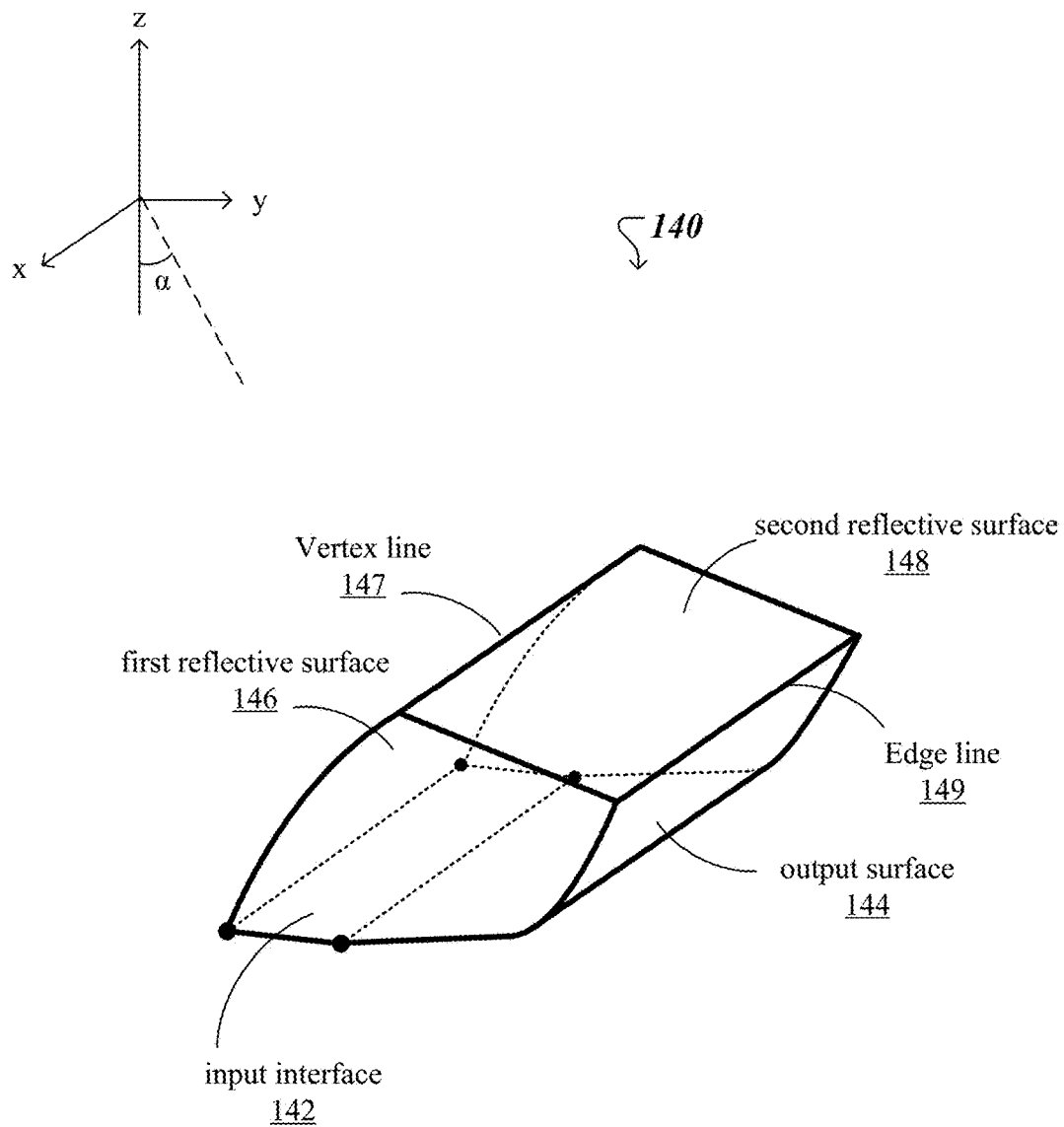

FIG. 1B shows that the light shaping optical article 140 is elongated along the x-axis. Note that the second reflective surface 148 intersects the first reflective surface 146 along vertex line 147 and the output surface 144 along edge line 149. The light shaping optical article 140 outputs light substantially on one side of the y=0 plane. Other implementations of a light shaping optical article may be configured to output light on both sides of the y=0 plane (not illustrated). Such an optical article may be configured as integrally formed combination of two abutting light shaping optical articles as illustrated in FIG. 1B in which one is mirrored about the y=0 plane, for example.

Moreover, input angular range 135 and output angular range 145 can be the same in the (z-x) plane while ignoring refraction at the output surface. An input interface corresponding to the input surface 142 represents an extended light source. In implementations in which the input surface 142 of the light shaping optical article 140 is coupled to an output end of a light guide (as it is in the case illustrated in FIG. 3A), a prevalent propagation direction of the input angular range 135 can be parallel to the light guide.

A divergence of the input angular range 135 in a (y-z) plane (a plane perpendicular to the x-axis) can be that of a Lambertian or narrower distribution, for example. As another example, a distribution of light within the input angular range 135 in the (y-z) plane can also have more than one peak. For solid light guides, the divergence of the input angular range is typically narrow enough to allow all light to be guided within the light guide via total internal reflection (TIR). Depending on the implementation, a lateral distribution of light within the input angular range 135 in the (x-z) plane (e.g., parallel to the x-axis) can be shaped similarly to the distribution of light within the input angular range 135 in the (y-z) plane. In some implementations, such a lateral distribution can have a bat-wing profile with multiple lobes, for example. Divergence in the (x-z) plane of the output angular range 145 is determined by the divergence of the input angular range 135, and may be affected by the refractive indices at and the curvatures and arrangements of surfaces 144, 146 and 148, for example.

Figure 1C:
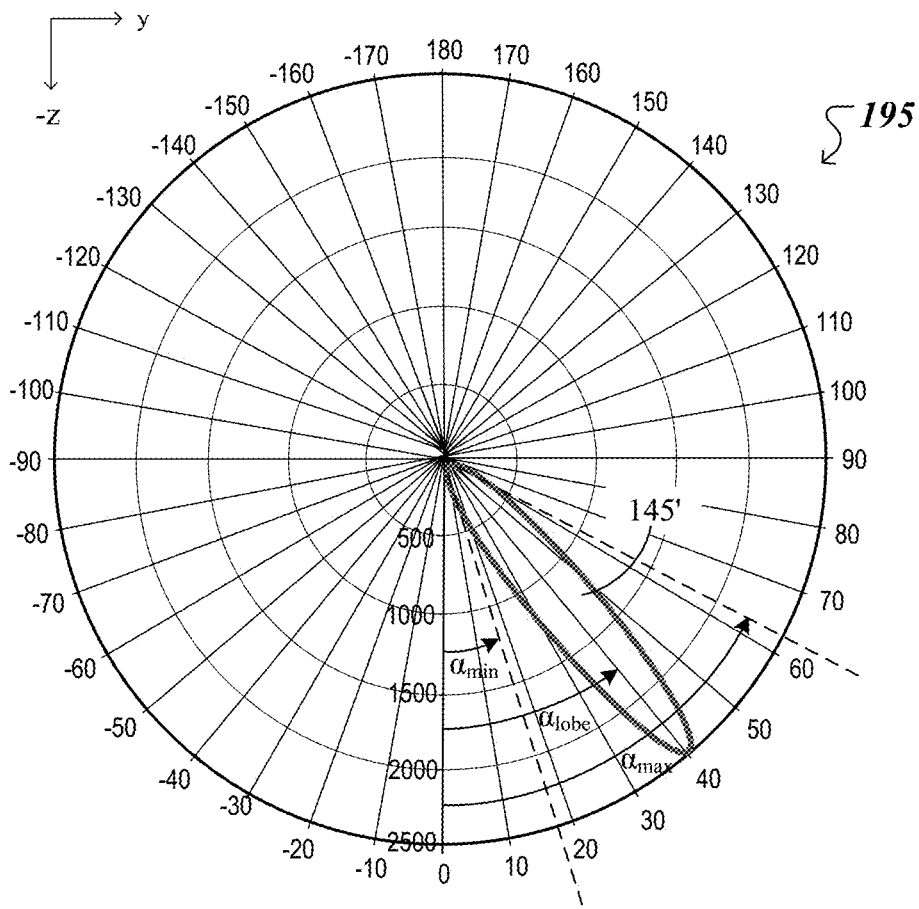

FIG. 1C shows a light intensity distribution 195 of the light output by the light shaping optical article 140 in the (y-z) plane. Here, the z-axis is aligned along the prevalent propagation direction of light in the input angular range 135. A lobe 145' of the light intensity distribution 195 represents the light output by the light shaping optical article 140 in the output angular range 145. A bisector of the lobe 145' corresponds to the prevalent propagation direction of light of the output angular range 145. Here, the bisector of the lobe 145' is tilted by a tilt angle $\alpha=\alpha_{lobe}$ relative to the z-axis, and a value of $\alpha_{lobe}$ is about 40°. In other implementations, the value of $\alpha_{lobe}$ can be different, for example about 5, 10, 30 or 50°, or other tilt values. A width at half-max of the lobe 145' corresponds to the divergence of light of the output angular range 145. Here, the width at half-max of the lobe 145' has a value of about 20°. In other implementations, the value of the width at half-max of the lobe 145' can be about 5, 10 or 30°, or other divergence values. Angles $\alpha_{min}$ and $\alpha_{max}$ define an angular interval outside of which the light intensity drops to less than 5% from the peak intensity value of the lobe 145'.

The tilt $\alpha$, divergence (e.g., the width of lobe 145' of the light intensity distribution 195) of output angular range 145 and the corresponding intensity distribution output by the light shaping optical article 140 are determined to satisfy a specified distance "d"—from an "effective center" of the output surface 144 of the light shaping optical article 140 to the target surface 190 of specified height H to provide illuminance on the target surface with a specified uniformity. As noted, the uniformity can be defined for example as $I_{MAX}/I_{min}$ below a maximum value N: $1<I_{MAX}/I_{min}<N$, over the entire height H of target surface 190. In some cases, the tilt $\alpha$, divergence of output angular range 145 and the corresponding intensity distribution output by the light shaping optical article 140 have to satisfy, in addition to the foregoing specified distance d and height H, a specified height, denoted $z_{spot}$, on the target surface 190 above ground (z=0) where the prevalent direction of propagation (denoted in dashed-line) of the output angular range 145 intersects the target surface 190, for example. As shown in the analyses illustrated in FIGS. 5-13, the intersection point at $z_{spot}$ can correspond to maximum intensity $I_{MAX}$ of the output light on the target surface 190, and intersections of outer rays of the output angular range 145—tilted respectively at $\alpha_{min}$ and $\alpha_{MAX}$ relative to the z-axis—can correspond to minimum intensity $I_{min}$ of the output light on the target surface 190.

It is noted that, in general, the divergence and propagation direction of light in the output angular range 145 can be controlled largely by a combination of (i) an optical power of the first reflective surface 146, (ii) an optical power of the second reflective surface 148, (iii) an optical power of the output surface 144 and (iv) arrangements of the first reflective surface 146, the second reflective surface 148 and the output surface 144 with respect to each other and to the z-axis. The specific shapes of the respective surfaces can influence the intensity distribution and thereby affect the degree of uniformity of the illuminance on the target surface 190.

An example implementation of the light shaping optical article 140 disclosed above is described next.

Example of a Light Shaping Optical Article

Figure 2A:
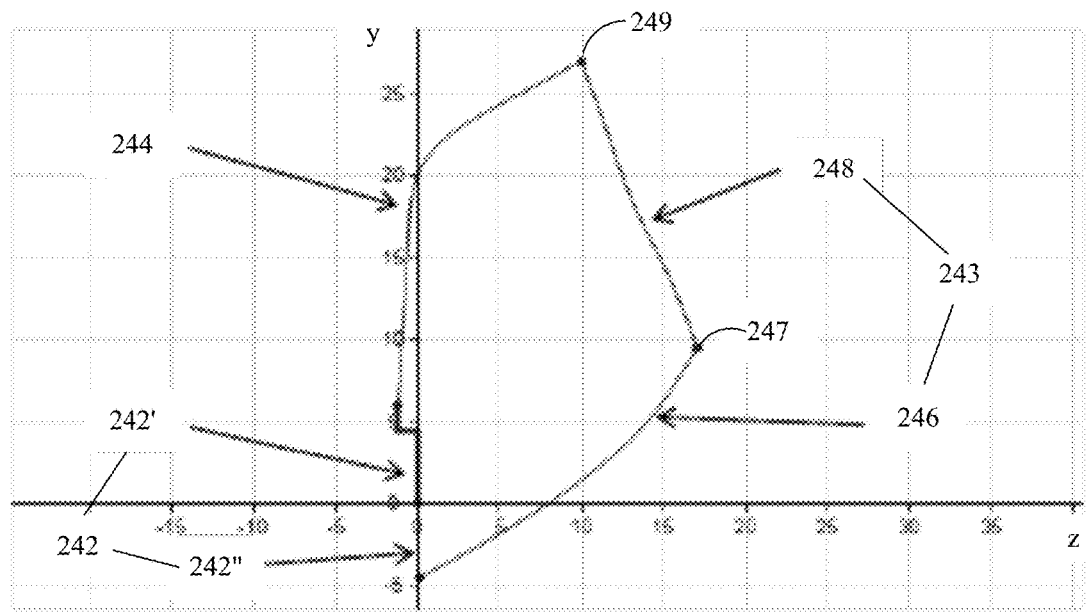
FIGS. 2A-2F show structural aspects of an example of a light shaping optical article.

FIG. 2A is a cross-section in the (y-z) plane of an example of a light shaping optical article 240. The light shaping optical article 240 is formed from a solid material (with refractive index n>1). For example, the material can be glass with a refractive index of about 1.5. As another example, the material can be plastic with a refractive index of about 1.5-1.6. The light shaping optical article 240 includes an input surface 242, an output surface 244, a first reflective surface 246 and a second reflective surface 248. Note that the first reflective surface 246 and the second reflective surface 248 intersect at vertex 247 and form a redirecting surface 243 of the light shaping optical article 240. Additionally, the second reflective surface 248 intersects the output surface 244 at edge 249.

Figure 2B:
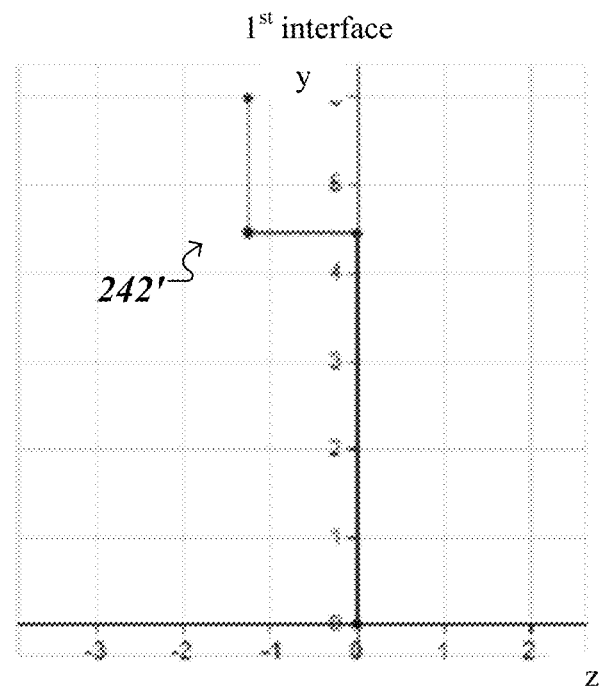

The input surface 242 is formed from a first interface 242' (also referred to as the $1^{st}$ interface), which is represented above the z-axis in this example, and a second interface 242" (also referred to as the $2^{nd}$ interface), which is represented below the z-axis in this example. FIG. 2B is a cross-section in the (y-z) plane of the $1^{st}$ interface 242'—the z and y axes have different scaling. Coordinates of a polyline corresponding to the $1^{st}$ interface 242' are given in Table 1.

TABLE 1

| $1^{st}$ interface 242' | | |
|---|---|---|
| Point | z (mm) | y (mm) |
| 1 | 0 | 0 |
| 2 | 0 | 4.45 |
| 3 | −1.25 | 4.45 |
| 4 | −1.25 | 4.475 |
| 5 | −1.25 | 6 |

Figure 2C:
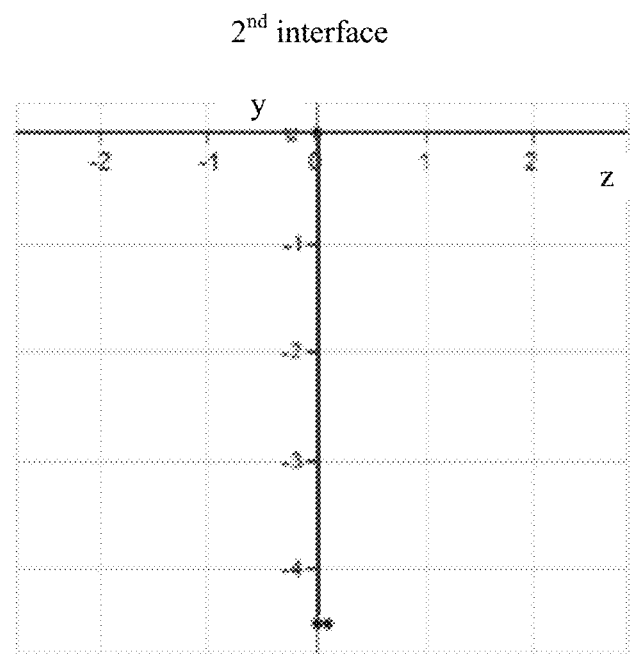

FIG. 2C is a cross-section in the (y-z) plane of the $2^{nd}$ interface 242"—again, the z and y axes have different scaling. Coordinates of a polyline corresponding to the $2^{nd}$ interface 242" are given in Table 2.

TABLE 2

| $2^{nd}$ interface 242" | | |
|---|---|---|
| Point | z (mm) | y (mm) |
| 1 | −1.0 | −4.5 |
| 2 | 0 | −4.5 |
| 3 | 0 | 0 |

The input surface 242 of the light shaping optical article 240 can be bonded to an output end of a light guide as described below in connection with FIGS. 3A-3B, for instance. In such case, an anti-reflective coating may be disposed between the output end of the light guide and light shaping optical article 240. If the material of the light shaping optical article 240 is different from the material from which the light guide is formed, for example an index matching layer may be disposed between the output end of the light guide and light shaping optical article 240. In other cases, the light guide and the light shaping optical article 240 can be integrally formed.

Figure 2D:
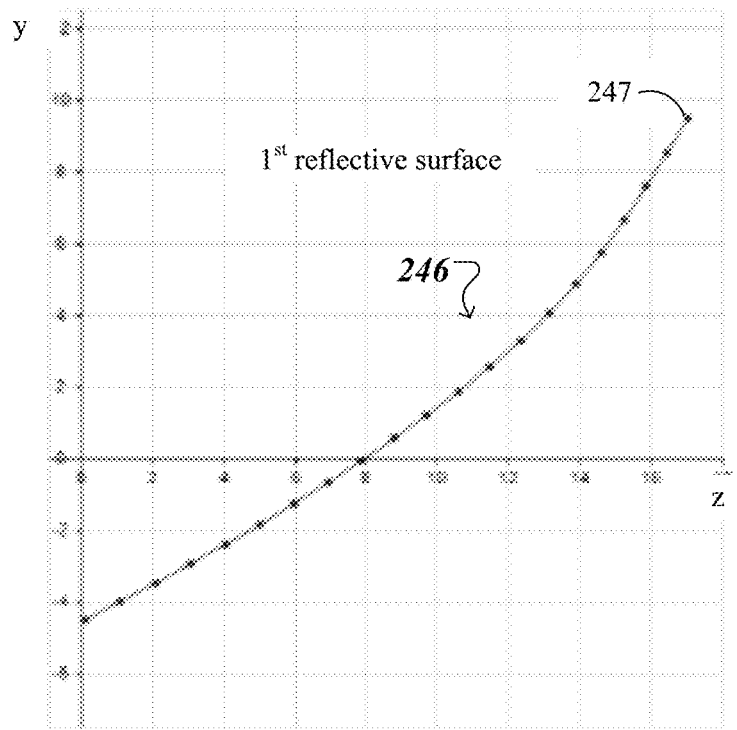

FIG. 2D is a cross-section in the (y-z) plane of the first reflective surface 246. Coordinates of nodes for a fitted curve, e.g., a spline, corresponding to the first reflective surface 246 are given in Table 3.

TABLE 3

$1^{st}$ reflective surface 246

| Point | z (mm) | y (mm) |
|---|---|---|
| 1 | 17 | 9.5 |
| 2 | 16.42 | 8.54 |
| 3 | 15.84 | 7.60 |
| 4 | 15.22 | 6.66 |
| 5 | 14.57 | 5.76 |
| 6 | 13.87 | 4.89 |
| 7 | 13.11 | 4.07 |
| 8 | 12.30 | 3.30 |
| 9 | 11.45 | 2.57 |
| 10 | 10.58 | 1.88 |
| 11 | 9.68 | 1.22 |
| 12 | 8.77 | 0.57 |
| 13 | 7.84 | −0.06 |
| 14 | 6.91 | −0.67 |
| 15 | 5.96 | −1.26 |
| 16 | 5.00 | −1.83 |
| 17 | 4.03 | −2.39 |
| 18 | 3.06 | −2.93 |
| 19 | 2.07 | −3.46 |
| 20 | 1.09 | −3.98 |
| 21 | 0.1 | −4.50 |

Here, the first reflective surface 246 of the light shaping optical article 240 is convex and, along with the second reflective surface 248 and the output surface 244, plays a major role in determining the tilt angle α relative to the z-axis of the propagation direction of light in the output angular range 145 and the divergence of the output angular range 145. Note that point 1 of the first reflective surface 246 corresponds to the vertex 247 where the first reflective surface intersects the second reflective surface 248. In some implementations, the first reflective surface 246 is uncoated. In such cases, light from the input surface 242 that impinges on the first reflective surface 246 at angles beyond a critical angle θ=arcsine(1/n) relative to the respective surface normal reflects off the first reflective surface via total internal reflection (TIR). In other implementations, the first reflective surface 246 is coated with a reflective coating. In such cases, light from the input surface 242 that reaches the first reflective surface 246 reflects off the first reflective surface via specular reflection or diffuse reflection or a combination thereof.

Figure 2E:
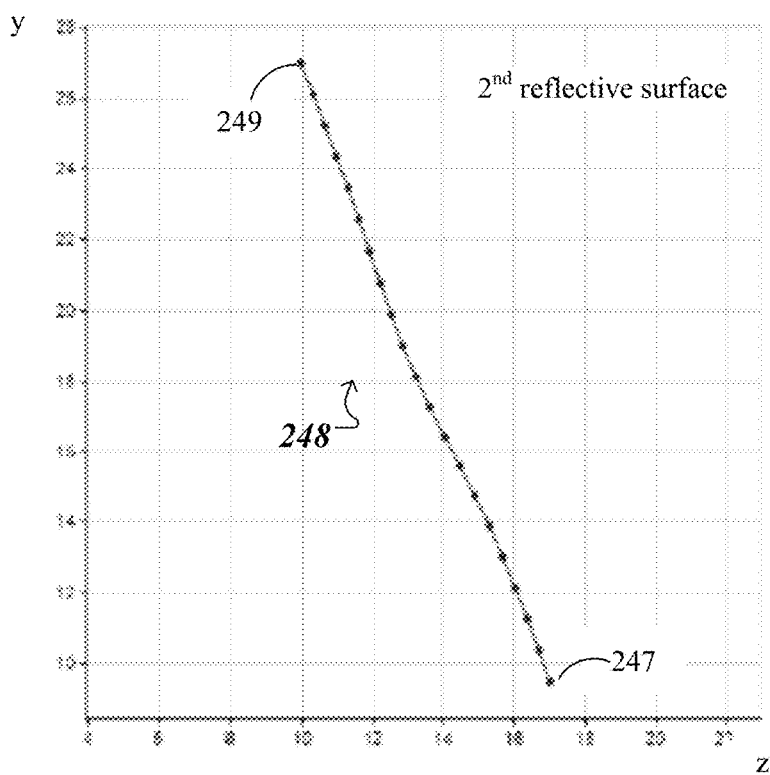

FIG. 2E is a cross-section in the (y-z) plane of the second reflective surface 248. Coordinates of nodes for a fitted curve, e.g., a spline, corresponding to the second reflective surface 248 are given in Table 4.

TABLE 4

$2^{nd}$ reflective surface 248

| Point | z (mm) | y (mm) |
|---|---|---|
| 1 | 9.95 | 27.00 |
| 2 | 10.29 | 26.12 |
| 3 | 10.62 | 25.24 |
| 4 | 10.95 | 24.35 |
| 5 | 11.28 | 23.46 |
| 6 | 11.60 | 22.57 |
| 7 | 11.90 | 21.68 |
| 8 | 12.20 | 20.78 |
| 9 | 12.51 | 19.89 |
| 10 | 12.84 | 19.01 |
| 11 | 13.20 | 18.14 |
| 12 | 13.60 | 17.28 |
| 13 | 14.03 | 16.43 |
| 14 | 14.46 | 15.60 |
| 15 | 14.89 | 14.75 |
| 16 | 15.30 | 13.90 |
| 17 | 15.68 | 13.04 |
| 18 | 16.03 | 12.16 |
| 19 | 16.37 | 11.28 |
| 20 | 16.69 | 10.39 |
| 21 | 17.00 | 9.50 |

Here, the second reflective surface 248 of the light shaping optical article 240 has a curvature that varies around zero and, along with the first reflective surface 246 and the output surface 244, plays a major role in determining the tilt angle α relative to the z-axis of the propagation direction of light in the output angular range 145 and the divergence of the output angular range 145. Note that point 1 of the second reflective surface 248 corresponds to the vertex 247 where the first reflective surface 246 intersects the second reflective surface, point 21 of the second reflective surface corresponds to the edge 249 where the output surface 244 intersects the second reflective surface. In some implementations, the second reflective surface 248 is uncoated. In such cases, light reflected by the first reflective surface 246 that impinges on the second reflective surface 248 at angles beyond the critical angle θ=arcsine(1/n) reflects off the second reflective surface via total internal reflection (TIR). In other implementations, the second reflective surface 248 is coated with a reflective coating. In such cases, light reflected by the first reflective surface 246 that reaches the second reflective surface 248 reflects off the second reflective surface via specular reflection or diffuse reflection or a combination thereof.

Figure 2F:
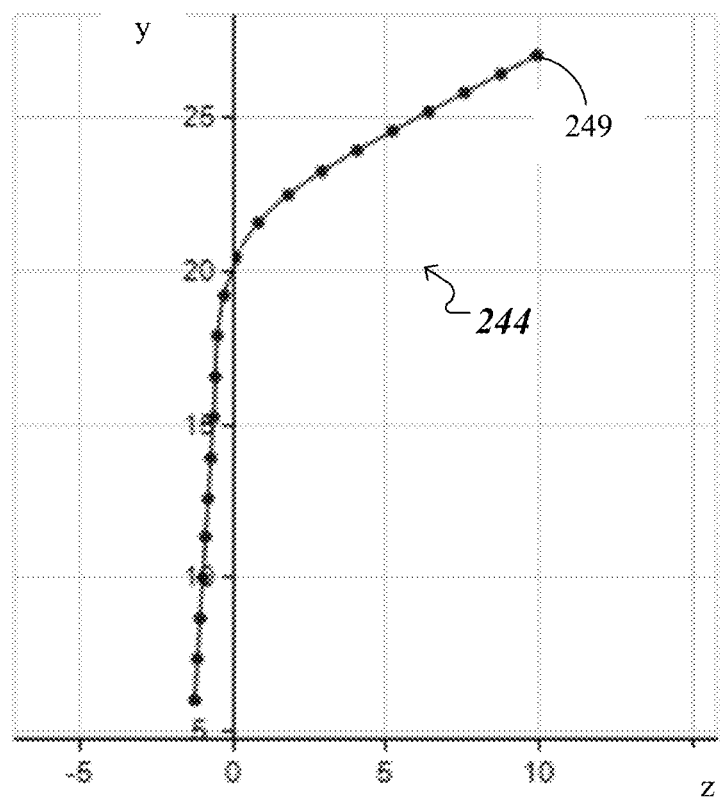

FIG. 2F is a cross-section in the (y-z) plane of the output surface 244. Coordinates of nodes for a fitted curve, e.g., a spline, corresponding to the output surface 244 are given in Table 5.

TABLE 5 output surface 244

| Point | z (mm) | y (mm) |
|---|---|---|
| 1 | −1.25 | 6.00 |
| 2 | −1.16 | 7.32 |
| 3 | −1.08 | 8.64 |
| 4 | −0.99 | 9.96 |
| 5 | −0.90 | 11.29 |
| 6 | −0.82 | 12.61 |
| 7 | −0.73 | 13.93 |
| 8 | −0.64 | 15.25 |
| 9 | −0.58 | 16.56 |
| 10 | −0.51 | 17.90 |
| 11 | −0.30 | 19.21 |
| 12 | 0.16 | 20.46 |

TABLE 5-continued output surface 244

| Point | z (mm) | y (mm) |
|---|---|---|
| 13 | 0.90 | 21.57 |
| 14 | 1.86 | 22.47 |
| 15 | 2.96 | 23.23 |
| 16 | 4.10 | 23.91 |
| 17 | 5.26 | 24.54 |
| 18 | 6.42 | 25.17 |
| 19 | 7.60 | 25.79 |
| 20 | 8.77 | 26.40 |
| 21 | 9.95 | 27.00 |

Here, the output surface 244 of the light shaping optical article 240 is convex and, along with the first reflective surface 246 and the second reflective surface 248, plays a major role in determining the tilt angle α relative the z-axis of the propagation direction of light in the output angular range 145 and the divergence of the output angular range 145. Note that point 21 of the output surface 244 corresponds to the edge 249 where the second reflective surface 248 intersects the output surface. In some implementations, the output surface 244 is uncoated. In other implementations, an anti-reflective coating may be provided on the output surface 244 such that light reflected by the second reflective surface 248 can transmit with minimal back reflection. In other implementations, the output surface 244 is coated with a diffusive coating (e.g., BrightView M PR05™ or BrightView M PR10™). In such cases, the light reflected by the second reflective surface 248 can diffuse upon transmission through the output surface 244.

The light shaping optical article 140 or 240 can be used in a light guide luminaire module, as described below in connection with FIG. 3A, such that light in the input angular range 135 is provided by solid-state light sources and guided by a light guide of the light guide luminaire module to the input surface 142 or 242 of the light shaping optical article 140 or 240, respectively.

Figure 3A:
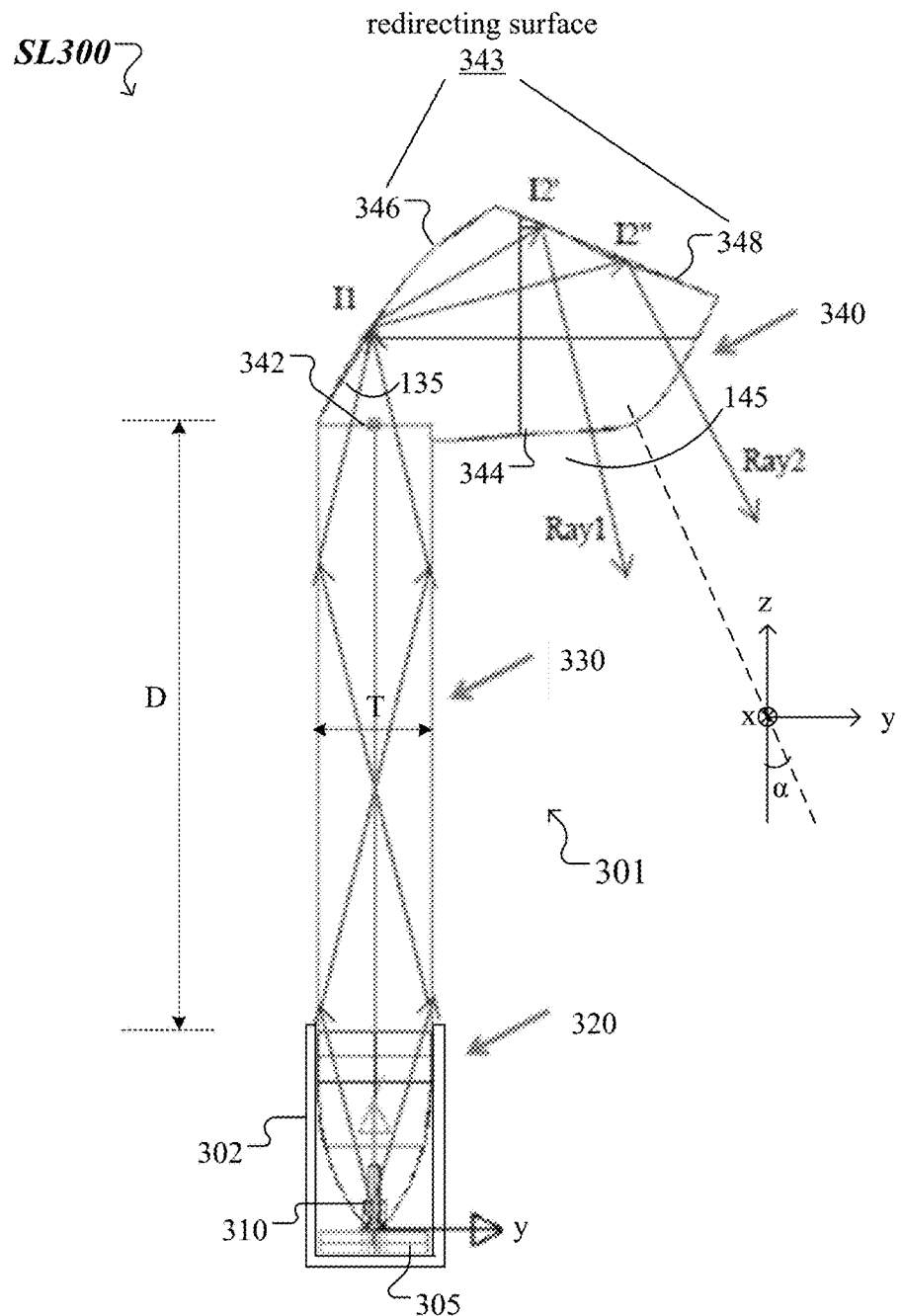
FIGS. 3A-3D show aspects of an example of a light guide luminaire module that includes a light shaping optical article.
Figure 3B:
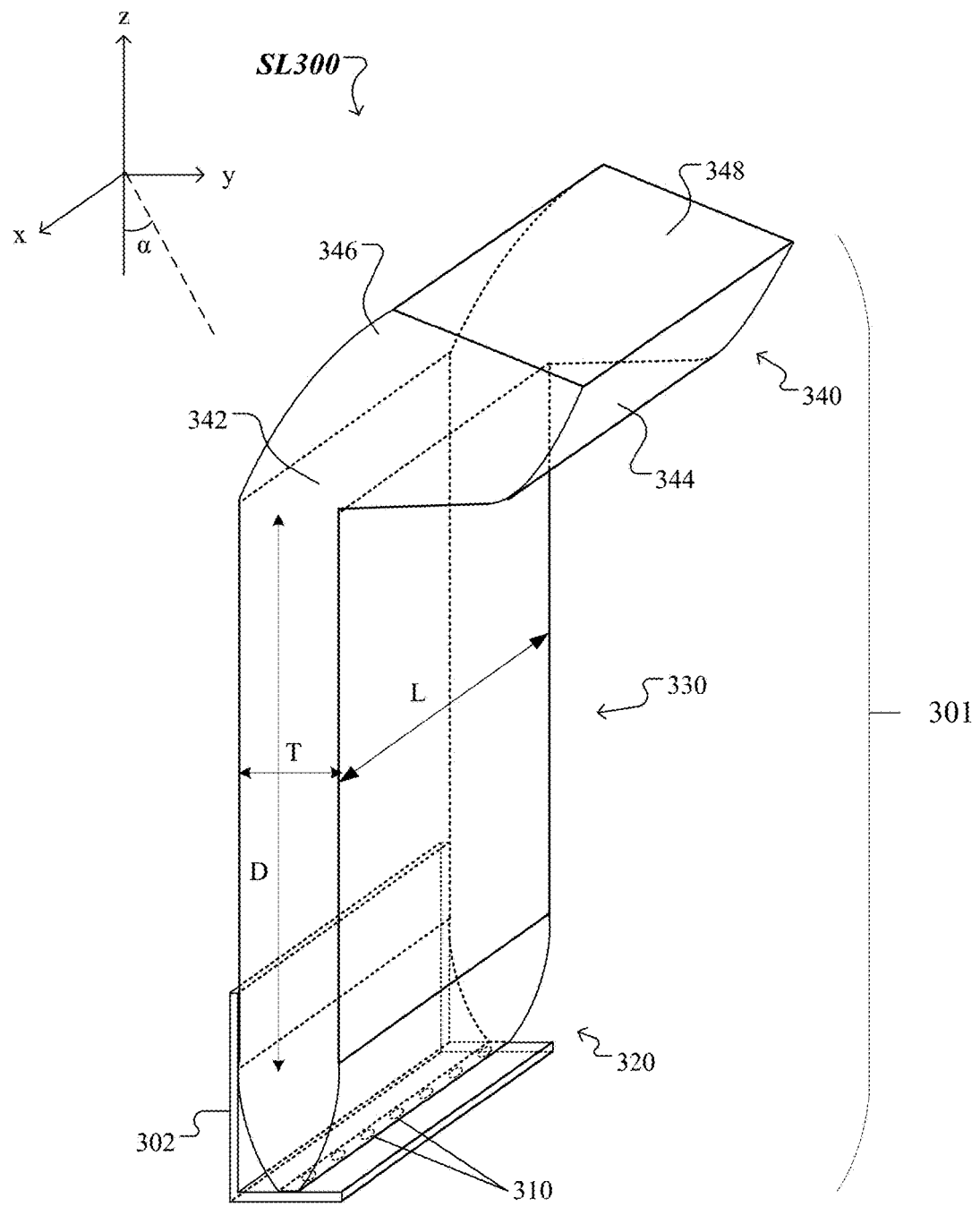

(ii) Illumination Device Based on Light Guide Luminaire Module with Light Shaping Optical Article FIGS. 3A-3B is an example of an illumination device SL300 based on a light guide luminaire module 301 that includes a light shaping optical article 340. In the context of the light guide luminaire module 301, the light shaping optical article 340 is referred to as the optical extractor 340. The optical extractor 340 can be implemented as a light shaping optical article 140 or 240 described in connection with FIG. 1A or 2A, for example. In the example illustrated in FIGS. 3A-3B, the illumination device SL300 includes the light guide luminaire module 301 and a housing 302 arranged and configured to support the light guide luminaire module.

The light guide luminaire module 301 includes, in addition to the optical extractor 340, a substrate 305, one or more light emitting elements (LEEs) 310 and a light guide 330. The light guide 330 guides the light provided by the LEEs 310 along a length D (e.g., along the z-axis of the Cartesian reference system shown in FIG. 3A.) Optionally, the light guide luminaire module 301 further includes one or more optical couplers 320, such that the light guide 330 is coupled at its input end to the LEEs via the optical coupler(s) 320 and at its output end to the optical extractor 340.

In general, a LEE, also referred to as a light emitter, is a device that emits radiation in one or more regions of the electromagnetic spectrum from among the visible region, the infrared region and/or the ultraviolet region, when activated. Activation of a LEE can be achieved by applying a potential difference across components of the LEE or passing a current through components of the LEE, for example. A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. In some implementations, a LEE is a specific device that emits the radiation, for example a LED die. In other implementations, the LEE includes a combination of the specific device that emits the radiation (e.g., a LED die) together with a housing or package within which the specific device or devices are placed. Examples of LEEs include also lasers and more specifically semiconductor lasers, such as vertical cavity surface emitting lasers (VCSELs) and edge emitting lasers. Further examples of LEEs include superluminescent diodes and other superluminescent devices.

During operation, the LEEs 310 provide light within a first angular range. Such light can have a Lambertian distribution relative to the optical axes of the one or more LEEs 310 (e.g., the z-axis.) The light guide 330 can be made from a solid, transparent material. For example, the material can be glass with a refractive index of about 1.5. As another example, the material can be plastic with a refractive index of about 1.5-1.6. Here, the light guide 330 is arranged to receive the light provided by the LEEs 310 at one end of the light guide 330 and to guide the received light in a forward direction, e.g., along the z-axis, from the receiving end to an opposing end of the light guide 330. Here, the distance D between the receiving end of the light guide 330 and its opposing end can be 5, 10, 20, 50 or 100 cm, for instance. A combination of (i) an angular range in which the light is received by the light guide 330 at the receiving end and (ii) a numerical aperture of the light guide 330 is configured such that the received light is guided from the receiving end to the opposing end through reflection off of light guide side surfaces of the light guide 330. Depending on the implementation, at least some, if not all, of this reflection is via total internal reflection (TIR). In some implementations, the numerical aperture of the light guide 330 is such that all light provided by the LEEs 310 in the first angular range can be injected directly into the light guide 330 at its receiving end.

In some implementations, the illumination device SL300 includes a light guide luminaire module 301 that has one or more optical couplers 320. In such cases, the one or more optical couplers 320 receive the light from the LEEs 310 within the first angular range and collimate the received light within a second angular range in the forward direction. The one or more optical couplers 320 are shaped to transform the first angular range 115 into the second angular range 125 via total internal reflection, specular reflection or both. Moreover, the one or more optical couplers 320 can include a solid transparent material for propagating light from an input end to an output end of each of the one or more optical couplers 320. Here, the divergence of the second angular range is smaller than the divergence of the first angular range. As such, the divergence of the second angular range is selected such that all light provided by the coupler(s) 320 in the second angular range can be injected into the light guide 330 at its receiving end.

Further, one or more of the light guide side surfaces can be planar, curved or otherwise shaped. The light guide side surfaces can be parallel or non-parallel. In embodiments with non-parallel light guide side surfaces, a third angular range 135 of the guided light at the opposing end of the light guide 330 is different than the first angular range (when the light guide 330 receives the light directly from the LEEs 310) or the second angular range (when the light guide 330 receives the light from the couplers 320) of the light received at the receiving end. Here, the light guide side surfaces can be optically smooth to allow for the guided light to propagate forward (e.g., in the positive direction of the z-axis) inside the light guide 330 through TIR. In this case, the light guide side surfaces are shaped and arranged with respect to the z-axis and each other such that the guided light impinges on the light guide side surfaces at incident angles larger than a critical angle over the entire distance D from the input end the output end of the light guide 330. In embodiments with parallel light guide side surfaces, whether the light guide 330 is solid or hollow, the third angular range 135 of the guided light at the opposing end of the light guide 330 has at least substantially the same divergence as the first angular range (when the light guide 330 receives the light directly from the LEEs 310) or the second angular range (when the light guide 330 receives the light directly from the couplers 320) of the light received at the receiving end.

In some implementations, the length D of the light guide 330 (along the z-axis), a width L of the light guide (along the x-axis) and a thickness T of the light guide (along the y-axis) are designed to homogenize the light emitted by the discrete LEEs 310—which are distributed along the x-axis—as it is guided from the receiving end to the opposing end of the light guide. In this manner, the homogenizing of the emitted light—as it is guided through the light guide 330—causes a change of a discrete profile along the x-axis of the first angular range (when the light guide receives the light directly from the LEEs 310) or the second angular range (when the light guide receives the light from the couplers 320) to a continuous profile along the x-axis of the third angular range 135 in which the discrete profile is partially or fully blurred.

Here, light in the third angular range 135 represents the input light for the optical extractor 340 and has a prevalent propagation direction along the z-axis. Similarly to the light shaping optical article 140 or 240, the optical extractor 340 is made from a solid, transparent material. For example, the material can be glass with a refractive index of about 1.5. As another example, the material can be plastic with a refractive index of about 1.5-1.6. The optical extractor 340 has an input surface 342 that is coupled to the output end of the light guide 330 to receive the guided light. The input surface 342 of the optical extractor 340 is adjacent to and optically coupled to the output edge of the light guide 330. For example, the optical extractor 340 can be affixed to light guide 330 using an index matching fluid, grease, or adhesive. In some implementations, optical extractor 340 is fused to light guide 330 or they are integrally formed from a single piece of material. In some implementations, the optical extractor 340 and the light guide 330 are mechanically pressed together (not illustrated).

Moreover, the optical extractor 340 includes a first reflective surface 346, a second reflective surface 348, and an output surface 344. As described above in connection with FIGS. 1A-1C and 2A-2F, a combination of (i) respective optical powers of the first reflective surface 346, the second reflective surface 348, and the output surface 344, and (ii) arrangements of the first reflective surface, the second reflective surface, and the output surface relative to each other and to the light guide direction (here the z-axis) determines the overall spatial distribution of the light in the output angular range 145 including the divergence of light in the output angular range 145 and a tilt angle α of prevalent propagation direction of the light in the output angular range relative to prevalent propagation direction of light in the third angular range 135.

In this manner, the one or more optical couplers 320, light guide 330 and the optical extractor 340 of the light guide luminaire module 301 are arranged and configured to translate and redirect light emitted by LEEs 310 away from the LEEs before the light is output into the ambient environment. The spatial separation of the place of generation of the light, also referred to as the physical (light) source, from the output surface 344—where light is extracted from the light guide luminaire module 301—also referred to as a virtual light source or a virtual filament, can facilitate design of the light guide luminaire module. In this manner, a virtual filament can be configured to provide substantially non-isotropic light emission with respect to planes parallel to an optical axis of the light guide luminaire module 301 (for example the z-axis.) In contrast, a typical incandescent filament generally emits substantially isotropically distributed amounts of light. The virtual filament(s) may be viewed as one or more portions of space from which substantial amounts of light appear to emanate. Furthermore, separating the LEEs 310, with their predetermined optical, thermal, electrical and mechanical constraints, from the place of light extraction, may facilitate a greater degree of design freedom of the light guide luminaire module 301 and allows for an extended optical path, which can permit a predetermined level of light mixing before light is output from the light guide luminaire module.

Moreover, the housing 302 can have a U-profile in the (y,z) plane, as shown in FIG. 3A, or a L-profile in the (y,z) plane, as shown in FIG. 3A, for example. Further, the housing 302 is elongated along the x-axis. A surface of the housing 302 that is parallel to the (x,y) plane is disposed adjacent to the substrate 305 of the light guide luminaire module 301, and the surfaces/surface of the housing 302 that are/is parallel to the (x,z) plane are/is coupled to the side surfaces/surface of the light guide 330 along a fraction of the length D of the light guide. This fraction can be 10, 30 or 50% of D, for instance.

Figure 3C:
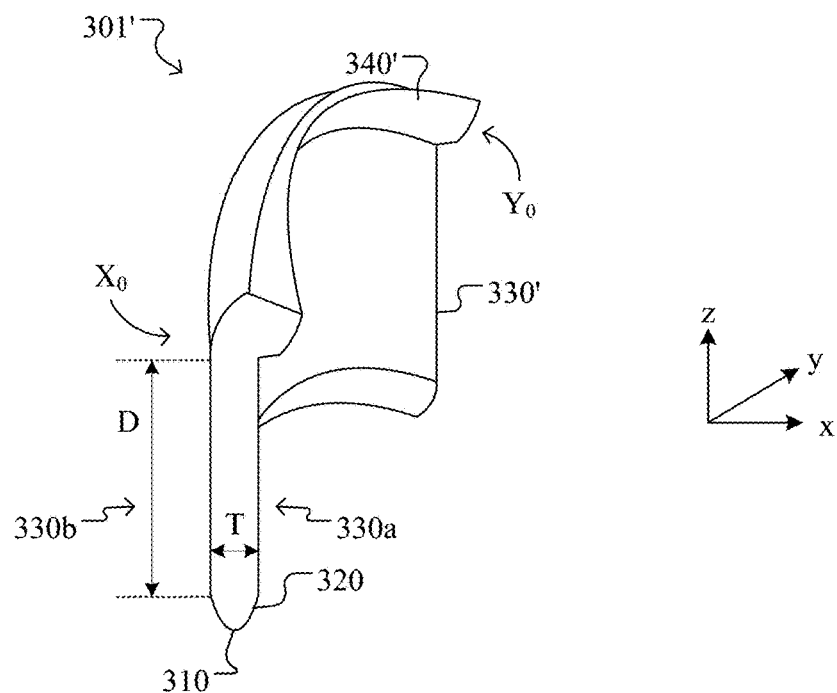
Figure 3D:
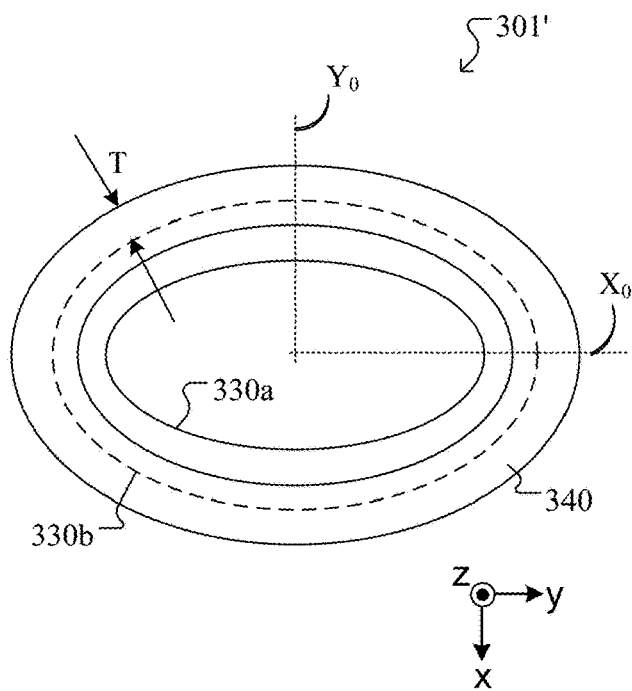

Other open and closed shapes of the light guide luminaire module 301 are possible. FIGS. 3C and 3D show a perspective view and a bottom view, respectively, of a luminaire module 301' for which the light guide 330' has two opposing side surfaces 330a, 330b that form a closed cylinder shell of thickness T. In the example illustrated in FIGS. 3C and 3D, the x-y cross-section of the cylinder shell formed by the opposing side surfaces 330a, 330b is oval. In other cases, the x-y cross-section of the cylinder shell can be circular or can have other shapes. Some implementations of the example luminaire module 301' may include a specular reflective coating on the side surface 330a of the light guide 330'. For T=0.05 D, 0.1 D or 0.2 D, for instance, light from multiple, point-like LEEs 310—distributed along an elliptical path of length L (the length of the ellipse arc or the circumference of the ellipse)—that is edge-coupled into the light guide 330' at the receiving end can efficiently mix and become uniform (quasi-continuous) along such an elliptical path by the time it propagates to the opposing end.

(iii) Illumination Devices Including One or More Light Guide Luminaire Modules

Figure 4A:
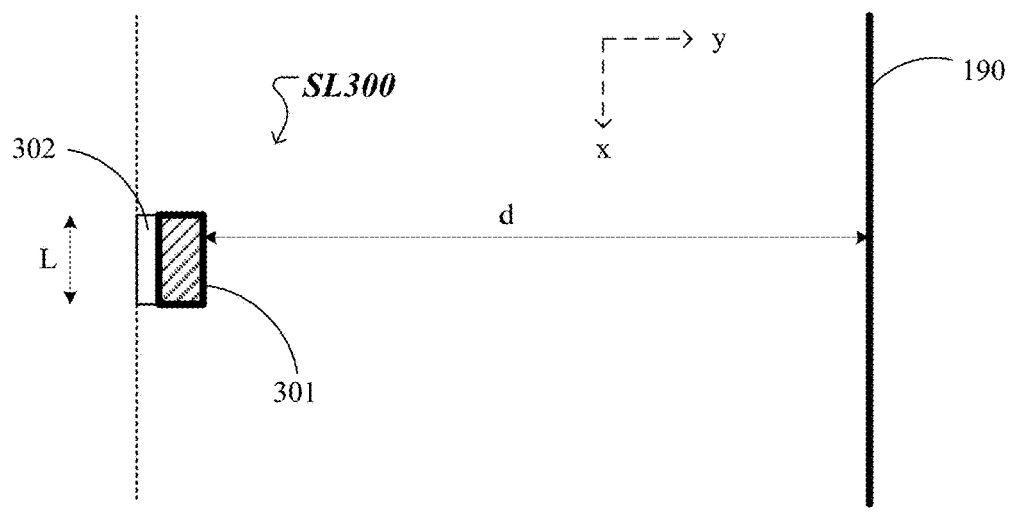
FIGS. 4A-4E show examples of stack lighter luminaires that include one or more light guide luminaire modules arranged like the one shown in FIGS. 3A-3B.

FIG. 4A shows a view in the (x,y)-plane of the illumination device SL300. As described above in connection with FIGS. 3A-3B, the illumination device SL300 includes a single light guide luminaire module 301 supported by the housing 302, such that the light guide 330 is parallel to the target surface 190 to guide light emitted by the LEEs 310 in the positive direction of the z-axis. In this example, a width L (along the x-axis) of the light guide luminaire module 301 of the illumination device SL300 is about 60 cm. The distance d from the optical extractor 340 of the light guide luminaire module 301 to the target surface 190 can be of order 12", 18", 24", or other distances. Note that respective length scales along the x-axis and along the y-axis are different in FIG. 4A. Dimensions of components such as the housing(s) and the light guide luminaire module may not be to scale and/or exaggerated relative to one another even within the same direction.

Figure 4B:
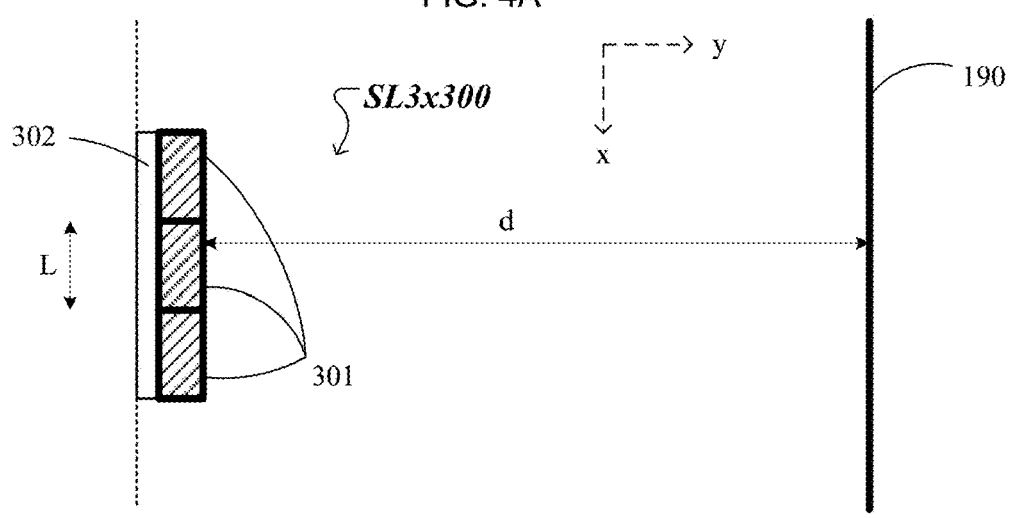

FIG. 4B shows a view in the (x-y)-plane of an illumination device SL3x300. Here, the illumination device SL3x300 includes three light guide luminaire modules 301 supported by the housing 302, such that each of the three light guides 330 is parallel to the target surface 190 to guide light emitted by the LEEs 310 in the positive direction of the z-axis. In other cases, each light guide luminaire module 301 can have its own housing (not illustrated). In the example illustrated in FIG. 4B, the three light guide luminaire modules 301 of the illumination device SL3x300 are arranged along a straight path (e.g., along the x-axis), with no separation between adjacent ones of the light guide luminaire modules. Here, a width L (along the x-axis) of each of the light guide luminaire modules 301 and the distance d from the optical extractor 340 of each of the light guide luminaire modules to the target surface 190 have the same values as the corresponding values in FIG. 4A.

Figure 4C:
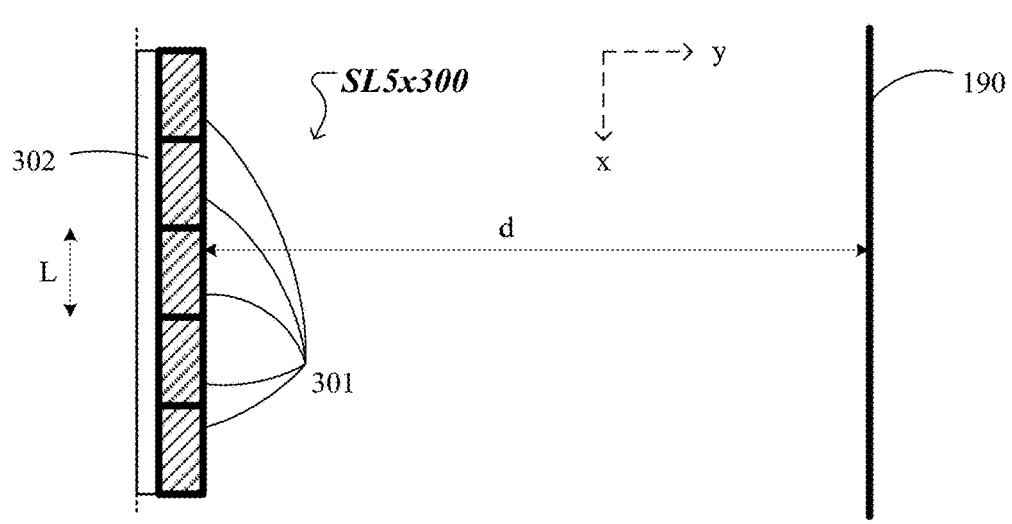

FIG. 4C shows a view in the (x-y)-plane of an illumination device SL5x300. Here, the illumination device SL5x300 includes five light guide luminaire modules 301 supported by the housing 302(s), such that each of the five light guides 330 is parallel to the target surface 190 to guide light emitted by the LEEs 310 in the positive direction of the z-axis. In the example illustrated in FIG. 4C, the five light guide luminaire modules 301 of the illumination device SL5x300 are arranged along a straight path (e.g., along the x-axis), with no separation between adjacent ones of the light guide luminaire modules. Here, a width L (along the x-axis) of each of the light guide luminaire modules 301 and the distance d from the optical extractor 340 of each of the light guide luminaire modules to the target surface 190 have the same values as the corresponding values in FIG. 4A.

Figure 4D:
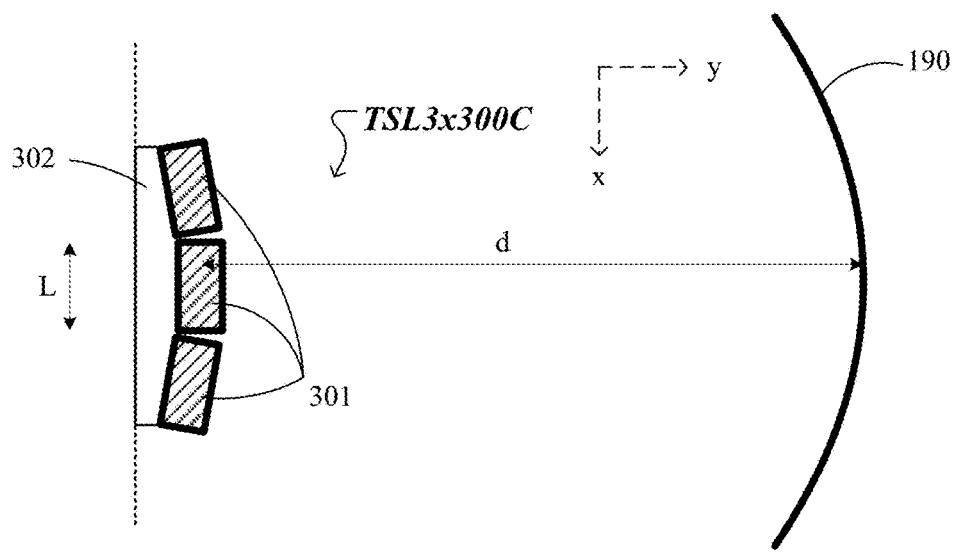

FIG. 4D shows a view in the (x-y)-plane of an illumination device SL3x300C. Here, the illumination device SL3x300C also includes three light guide luminaire modules 301 supported by the housing(s) 302, such that each of the three light guides 330 is parallel to the target surface 190 to guide light emitted by the LEEs 310 in the positive direction of the z-axis. However, the three light guide luminaire modules 301 of the illumination device SL3x300C are arranged along an open curved path, with no separation between adjacent ones of the light guide luminaire modules. The open curved path can be an arc of a torus, an arc of a circle, an arc of an ellipse, or some other open curved path. Here, a width L (along the path) of each of the light guide luminaire modules 301 and the distance d from the optical extractor 340 of each of the light guide luminaire modules to the target surface 190 have the same values as the corresponding values in FIG. 4A.

Figure 4E:
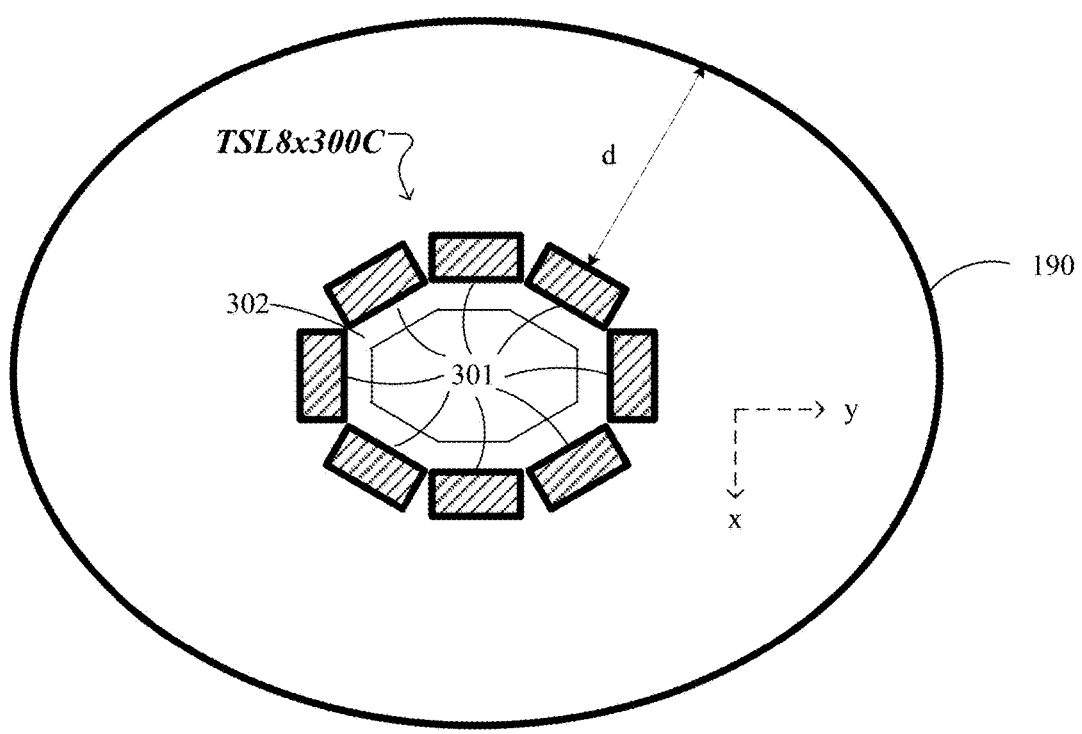

FIG. 4E shows a view in the (x-y)-plane of an illumination device SL8x300C. Here, the illumination device SL8x300C includes eight light guide luminaire modules 301 supported by the housing(s) 302, such that each of the eight light guides 330 is parallel to the target surface 190 to guide light emitted by the LEEs 310 in the positive direction of the z-axis. However, the eight light guide luminaire modules 301 of the illumination device SL8x300C are arranged along a closed curved path, with no separation between adjacent ones of the light guide luminaire modules. The closed curved path can be a torus, a circle, an ellipse, or some other closed curved path. In some implementations, the curved path can be a triangle, a square, a rectangle, a hexagon or other polygonal path. Here, a width L (along the path) of each of the light guide luminaire modules 301 and the distance d from the optical extractor 340 of each of the light guide luminaire modules to the target surface 190 have the same values as the corresponding values in FIG. 4A.

Figure 4F:
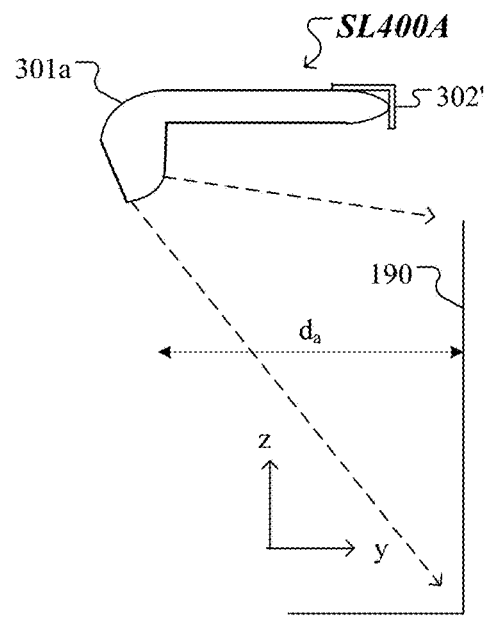
FIGS. 4F-4G show examples of other stack lighter luminaires that include one or more light guide luminaire modules arranged differently from the one shown in FIGS. 3A-3B.

Other illumination devices used as stack lighter luminaires or wall wash luminaires can be implemented by arranging one or more light guide luminaire modules such that each of their light guides is orthogonal to the target surface, as described below. FIG. 4F shows a view in the (y,z)-plane of an illumination device SL400A. The illumination device SL400A includes a single light guide luminaire module 301a supported by a housing 302', such that its light guide is orthogonal to the target surface 190 to guide light emitted by its LEEs in the negative direction of the y-axis. Here, the LEEs of the light guide luminaire module 301a are proximate to the target surface 190 and the extractor of the light guide luminaire module is remote from the target surface by a distance $d_a$ of order 24", 36", 48", for instance. Note that respective length scales along the y-axis and along the z-axis are different in FIG. 4F. Dimensions of components such as the housing(s) and the light guide luminaire module may not be to scale and/or exaggerated relative to one another even within the same direction. In this example, an extractor of the light guide luminaire module 301a is a light shaping optical article similar to, but different than, the light shaping optical articles 140 and 240 described above in connection with FIGS. 1A-1C and 2A-2F, or the optical extractor 340 described above in connection with FIGS. 3A-3B. Although different from the light shaping optical articles 140 and 240 or the optical extractor 340, the extractor of the light guide luminaire module 301a also is configured to illuminate the target surface 190 with a specified efficiency and uniformity.

Figure 4G:
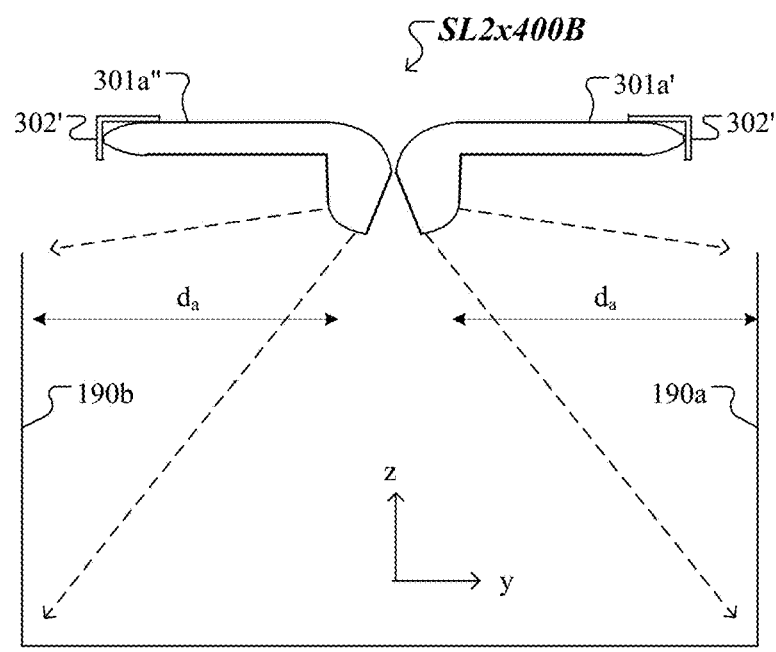

FIG. 4G shows a view in the (y,z)-plane of an illumination device SL2x400B. Here, the illumination device SL2x400B is arranged to illuminate first and second target surfaces 190a, 190b that are parallel to each other. The illumination device SL2x400B includes first and second light guide luminaire modules 301a', 301a" supported by respective housings 302', such that a light guide of the first light guide luminaire module 301a' is orthogonal to the first target surface 190a to guide light emitted by its LEEs in the negative direction of the y-axis, and a light guide of the second light guide luminaire module 301a" is orthogonal to the second target surface 190b to guide light emitted by its LEEs in the positive direction of the y-axis. Here, LEEs of the first light guide luminaire module 301a' are proximate to the first target surface 190a and its extractor is remote from the first target surface by the distance $d_a$, and LEEs of the second light guide luminaire module 301a" are proximate to the second target surface 190b and its extractor is remote from the second target surface by the distance $d_a$. In the example illustrated in FIG. 4G, the extractors of the first and second light guide luminaire module 301a', 301a" are butted against each other. In other cases, the extractors of the first and second light guide luminaire module 301a', 301a" can be separated from each other along the y-axis by a specified distance. Note that respective length scales along the y-axis and along the z-axis are different in FIG. 4G. Dimensions of components such as the housing(s) and the light guide luminaire module may not be to scale and/or exaggerated relative to one another even within the same direction. In this example, a respective extractor of the first and second light guide luminaire modules 301a', 301a" is a light shaping optical article similar to, but different than, the light shaping optical articles 140 and 240 described above in connection with FIGS. 1A-1C and 2A-2F, or the optical extractor 340 described above in connection with FIGS. 3A-3B. Although different from the light shaping optical articles 140 and 240 or the optical extractor 340, the respective extractor of the first and second light guide luminaire modules 301a', 301a" also is configured to illuminate the respective first and second target surfaces 190a, 190b with a specified efficiency and uniformity.

Samples of the illumination devices SL300, SL3x300 and SL5x300 have been fabricated and experiments have been conducted to evaluate their respective performance. Some of these experiments are summarized below.

(iv) Experimental Results

Stack lighter luminaires corresponding to the illumination devices SL300, SL3x300 and SL5x300 were used to illuminate various planar target surfaces (referred below as "stack detectors"). In addition, portion of the light provided by the illumination devices SL300, SL3x300 and SL5x300 that reached the floor, in front of each of the planar target surfaces was characterized using a floor detector. Table 6 shows configurations of the detectors used in this study.

TABLE 6

| Target surface | Plane | dim (x) (m) | dim (z or y) (m) |
|---|---|---|---|
| Stack Detector 1 (centered on Stack Detector 2) | (x, z) | 0.578 | 2 |
| Stack Detector 2 (centered on Stack Detector 3) | (x, z) | 1.219 | 2 |
| Stack Detector 3 (centered on Stack Detector 4) | (x, z) | 10 | 2 |
| Stack Detector 4 | (x, z) | 10 | 6.267 |
| Floor Detector | (x, y) | 10 | 0.914 |

The LEEs 310 used in each light guide luminaire module 301 included in the illumination devices SL300, SL3x300 and SL5x300 were implemented as either Luxeon Z ES (with one LED per channel of the optical couplers 320) or Luxeon Z (with two LEDs per channel of the optical couplers). For either of the foregoing implementations, the LEDs were modeled using ray data sets supplied by Lumileds™. The output surface 344 of the optical extractor 340 was left uncovered or was covered with a diffuse film implemented as either Brightview MPR05™ or Brightview MPR10™. For either of the foregoing implementations, characteristics of the diffusive surfaces were modeled using BSDF data files supplied by Brightview™. As noted above, a width (along the x-axis) of each light guide luminaire module 301 included in the illumination devices SL300, SL3x300 and SL5x300 is L=0.578 m.

Note that, in this study, each of the illumination devices SL300, SL3x300 and SL5x300 is disposed at a distance d=0.4572 m (18") in front of a stack 190. The height of the stack 190 is H=2 m from the floor level to the top of the stack, and a portion of interest (POI) of the stack spans (along the z-axis) over h=1.016 m (40") at the center of the stack.

Figure 5:
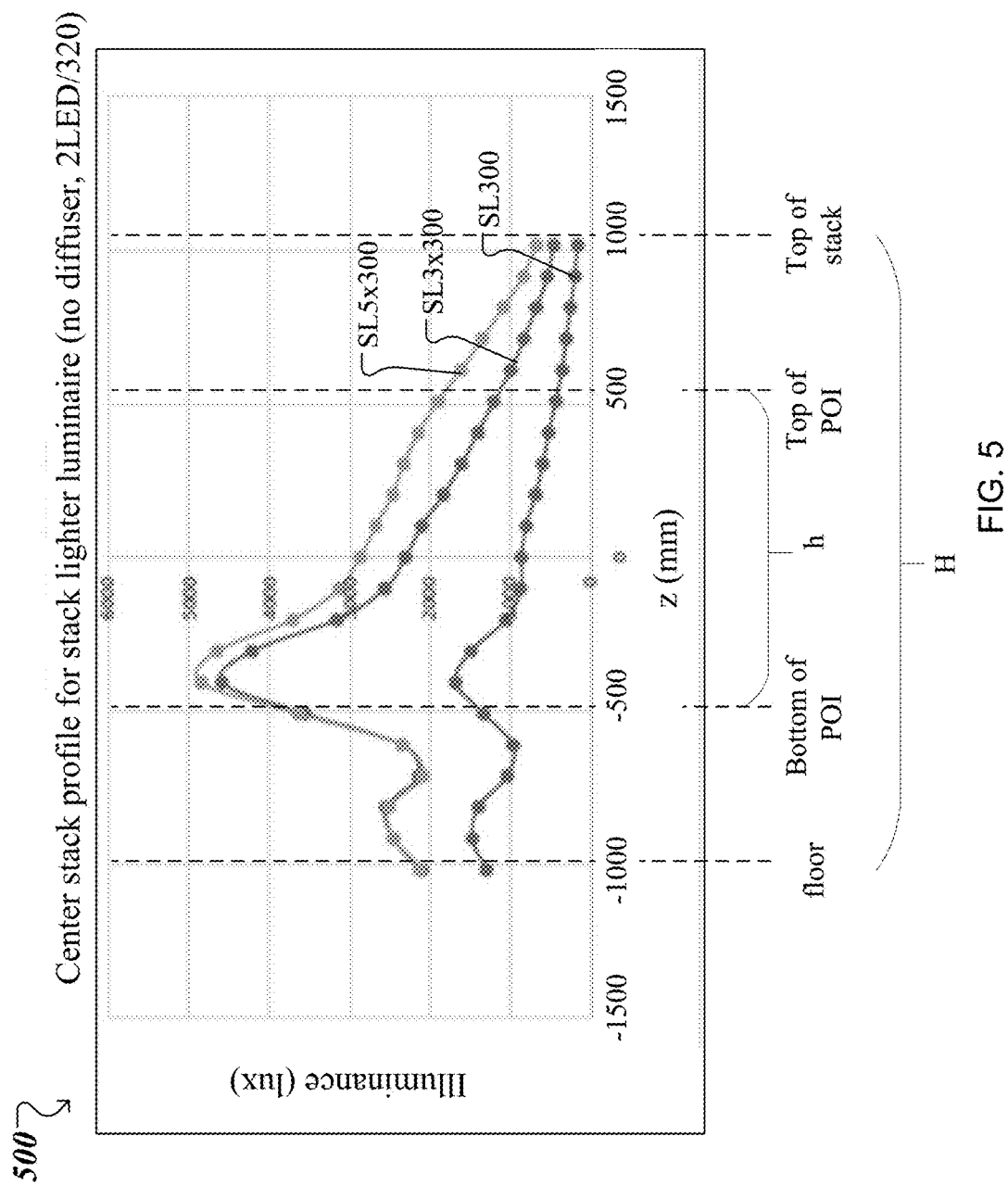
FIG. 5 shows results of simulation of stack lighter luminaires from FIGS. 4A-4C.

FIG. 5 shows a graph 500 of the illuminance (in lux) provided by the illumination devices SL300, SL3x300 and SL5x300 along the z-axis to the Detector 1 placed in front of the respective illumination devices on the stack 190. Here, the output surface 344 of the optical extractor 340 is non-diffusive, and the LEEs 310 are implemented based on Luxeon Z (i.e., with two LEDs per channel of the optical couplers 320). A significant jump in peak illuminance is shown in going from the illumination device SL300 to the illumination device SL3x300, but the jump from the illumination devices SL3x300 to the illumination device SL5x300 is much reduced. The relative change at the lower regions of the stack (for z<0) is greater than at the higher regions. Uniformity of the illumination provided by the illumination devices SL300, SL3x300 and SL5x300 over the entire height of the stack 190 and over the central POI of the stack is quantified in Table 7 as a ratio of the max/min illumination over H and max/min illumination over h, respectively.

TABLE 7

| Ratio | SL300 | SL3x300 | SL5x300 |
|---|---|---|---|
| Max/Min over H | 10.01 | 9.86 | 7.15 |
| Max/Min over h | 3.83 | 3.81 | 2.56 |

Note the uniformity increases as the number of light guide luminaire modules 301 included in the illumination devices SL300, SL3x300 and SL5x300 increases.

Additional performance of the illumination devices SL300, SL3x300 and SL5x300 is characterized below. Experimental results for the illumination device SL300 that includes a single light guide luminaire module 301 are summarized in Table 8. Here, the light source of the light guide luminaire module 301 is based on Luxeon Z (i.e., with two LEDs 310 per channel of the optical couplers 320) and is simulated using 2e+6 rays. In this manner, the light guide luminaire module 301 of the illumination device SL300 supplies a total power of 4032 lumens. All power levels in Table 8 are in lumens.

TABLE 8

| Result | SL300 w/o diffuser | SL300 w/ MPR05 | SL300 w/ MPR10 |
|---|---|---|---|
| Power measured in far field | 3659 | 3425 | 3207 |
| Overall Total efficiency | 91% | 85% | 80% |
| Power measured by Stack Detector 1 | 620 | 613 | 559 |
| Power measured by Stack Detector 2 | 1209 | 1175 | 1086 |
| Power measured by Stack Detector 3 | 2089 | 1960 | 1836 |
| Far Field Efficiency at Stack Detector 3 | 57% | 57% | 57% |
| Total Efficiency at Stack Detector 3 | 52% | 49% | 46% |
| Power measured by Stack Detector 4 | 2952 | 2729 | 2538 |
| Far Field Efficiency at Stack Detector 4 | 81% | 80% | 79% |
| Power measured by Floor Detector | 1372 | 1273 | 1201 |

Note that, for the illumination device SL300, both the overall total efficiency and the total efficiency evaluated at Stack Detector 3 decrease from a largest value for a case when the output surface 344 of the optical extractor 340 is non-diffusive, to an intermediate value for a case when the output surface of the optical extractor includes a diffusive film MPR05, to a smallest value for a case when the output surface of the optical extractor includes a diffusive film MPR10. However, note that each of the far field efficiency evaluated at Stack Detector 3 and the far field efficiency evaluated at Stack Detector 4 tends to remain constant regardless of whether the output surface 344 of the optical extractor 340 is non-diffusive, or it includes either of diffusive films MPR05 or MPR10.

Further, experimental results for the illumination device SL5x300 that includes five light guide luminaire modules 301 are summarized in Table 9. Here, the light source of each of the five light guide luminaire modules 301 is based on Luxeon Z (i.e., with two LEDs 310 per channel of the optical couplers 320) and is simulated using 2e+6 rays. In this manner, each of the five light guide luminaire modules 301 supplies a total power of 4032 lumens, such that the illumination device SL5x300 supplies a total power of 20160 lumens. All power levels in Table 9 are in lumens.

TABLE 9

| Result | SL5x300 w/o diffuser | SL5x300 w/ MPR05 | SL5x300 w/ MPR10 |
|---|---|---|---|
| Power measured in far field | 18024 | 17178 | 16181 |
| Total efficiency | 89% | 85% | 80% |
| Power measured by Stack Detector 1 | 1986 | 1837 | 1716 |
| Power measured by Stack Detector 2 | 4057 | 3815 | 3559 |
| Power measured by Stack Detector 3 | 10433 | 9793 | 9176 |
| Far Field Efficiency at Stack Detector 3 | 58% | 57% | 57% |
| Total Efficiency at Stack Detector 3 | 52% | 49% | 46% |
| Power measured by Stack Detector 4 | 14459 | 13341 | 12409 |
| Far Field Efficiency at Stack Detector 4 | 80% | 78% | 77% |
| Power measured by Floor Detector | 6941 | 6572 | 6232 |

Note that, for the illumination device SL5x300, both the overall total efficiency and the total efficiency evaluated at Stack Detector 3 decrease from a largest value for a case when the output surface 344 of the optical extractor 340 is non-diffusive, to an intermediate value for a case when the output surface of the optical extractor includes a diffusive film MPR05, to a smallest value for a case when the output surface of the optical extractor includes a diffusive film MPR10. However, note that each of the far field efficiency evaluated at Stack Detector 3 and the far field efficiency evaluated at Stack Detector 4 tends to remain constant regardless of whether the output surface 344 of the optical extractor 340 is non-diffusive, or it includes either of diffusive films MPR05 or MPR10.

Further note that, while the power levels measured by the Stack Detectors in the case of the illumination device SL5x300 are proportionally greater than in the case of the illumination device SL300, the efficiencies of providing the power to the Stack Detectors are substantially unchanged between the case of the illumination device SL5x300 and the case of the illumination device SL300.

Further, experimental results for a different configuration of the illumination device SL5x300 that includes five light guide luminaire modules 301 are summarized in Table 10. Here, the light source of each of the five light guide luminaire modules 301 is based on Luxeon Z ES (i.e., with a single LEDs 310 per channel of the optical couplers 320) and is simulated using 1e+6 rays. In this manner, each of the five light guide luminaire modules 301 supplies a total power of 4032 lumens, such that the illumination device SL5x300 supplies a total power of 20160 lumens. All power levels in Table 9 are in lumens.

TABLE 10

| Result | SL5x300 w/o diffuser | SL5x300 w/ MPR05 | SL5x300 w/ MPR10 |
|---|---|---|---|
| Power measured in far field | 17974 | 17116 | 16122 |
| Total efficiency | 89% | 85% | 80% |
| Power measured by Stack Detector 1 | 1957 | 1835 | 1708 |
| Power measured by Stack Detector 2 | 4023 | 3783 | 3526 |
| Power measured by Stack Detector 3 | 10375 | 9737 | 9112 |
| Far Field Efficiency at Stack Detector 3 | 58% | 57% | 57% |
| Total Efficiency at Stack Detector 3 | 51% | 48% | 45% |
| Power measured by Stack Detector 4 | 14476 | 13314 | 12374 |
| Far Field Efficiency at Stack Detector 4 | 81% | 78% | 77% |
| Power measured by Floor Detector | 6951 | 6577 | 6241 |

Note that, for this configuration of the illumination device SL5x300, both the overall total efficiency and the total efficiency evaluated at Stack Detector 3 decrease from a largest value for a case when the output surface 344 of the optical extractor 340 is non-diffusive, to an intermediate value for a case when the output surface of the optical extractor includes a diffusive film MPR05, to a smallest value for a case when the output surface of the optical extractor includes a diffusive film MPR10. However, note that each of the far field efficiency evaluated at Stack Detector 3 and the far field efficiency evaluated at Stack Detector 4 tends to remain constant regardless of whether the output surface 344 of the optical extractor 340 is non-diffusive, or it includes either of diffusive films MPR05 or MPR10.

Further note that, using a single LED 310 per channel of the optical coupler 320 of a light guide luminaire module 301 allows for centering the LED on the entrance aperture of the channel of the optical coupler and, thus, introduces a small change in the flux distribution and alignment that each channel of the optical coupler sees. However, the fact that the results presented in Table 10 are similar to the results presented in Table 9 suggests that the foregoing structural difference between the implementations of the light guide luminaire modules 301 has no significant effect on the performance of the illumination device SL5x300.

More detailed results of the noted experiments are described below.

Experimental Results for Illumination Device SL300 with Two LEDs 310 Per Channel of the Optical Couplers 320

Figure 6C:
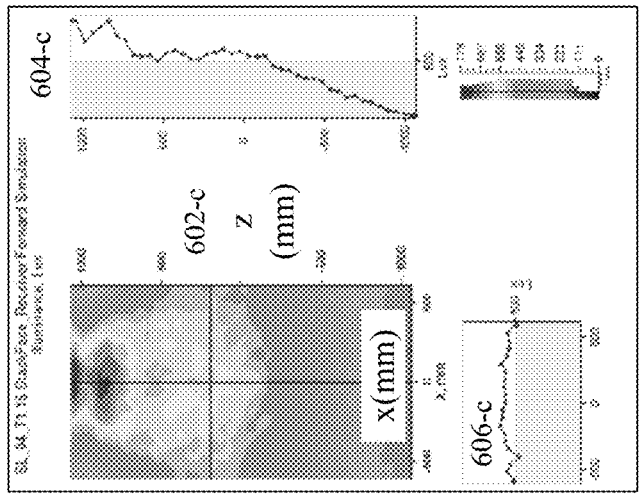
FIGS. 6A-6C, 7A-7C, 12A and 13A show results of simulation of the stack lighter luminaire from FIG. 4A.
Figure 6B:
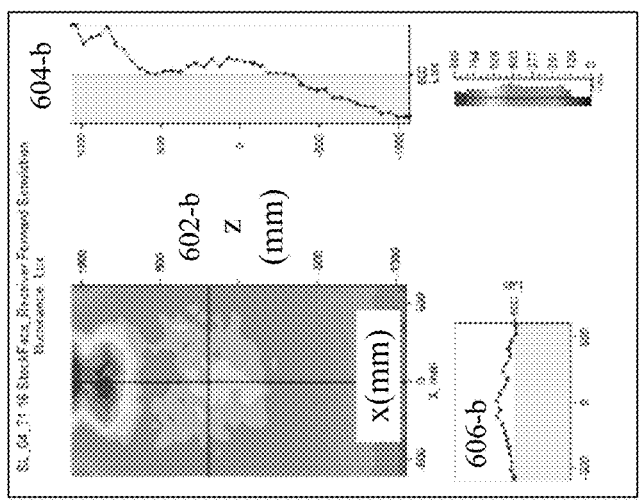
Figure 6A:
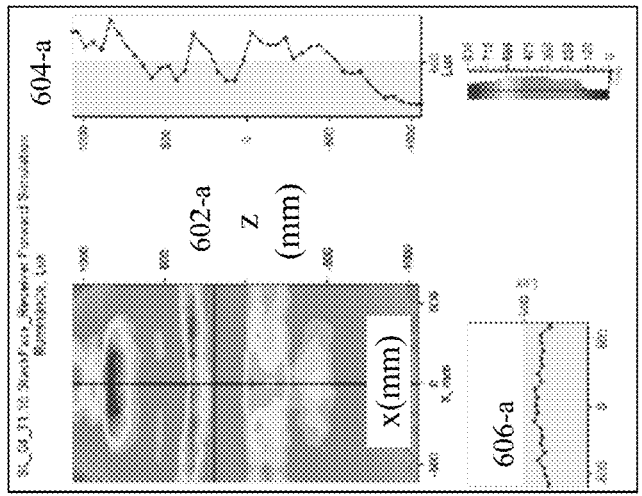

FIG. 6A/6B/6C shows an illuminance (x,z)-contour plot 602-a/602-b/602-c measured by Stack Detector 2 (see Table 6) when the output surface 344 of the optical extractor 340 of the light guide luminaire module 301 of the illumination device SL300 is respectively non-diffusive, diffusive based on diffusive film MPR05 and diffusive based on diffusive film MPR10. FIG. 6A/6B/6C also shows a z-axis cross-section 604-a/604-b/604-c that represents vertical variation of the illuminance of the Stack Detector 2 through the center of the illumination device SL300, and an x-axis cross-section 606-a/606-b/606-c that represents horizontal variation of the illuminance of the Stack Detector 2 at half height. Theses experimental results indicate the vertical uniformity of the illumination provided by the illumination device SL300 as a function of the diffusive properties of the output surface 344 of the optical extractor 340 of the light guide luminaire module 301 with two LEDs 310 per channel of the optical couplers 320.

Figures 7A, 7B, 7C:
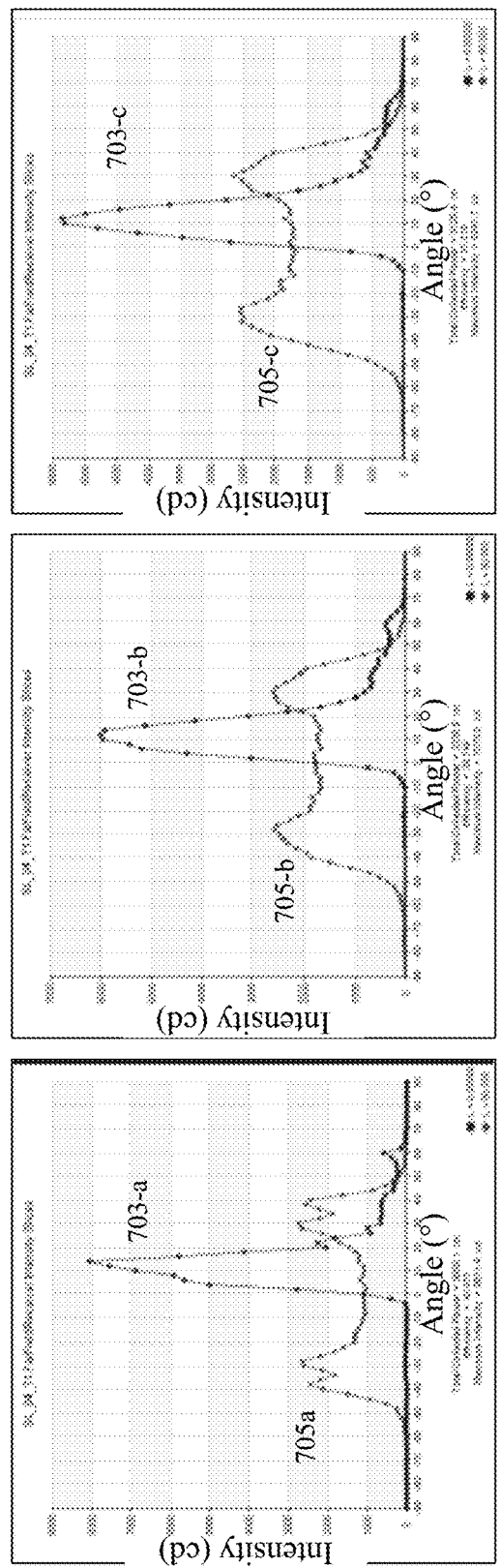

FIG. 7A/7B/7C shows an (y,z)-intensity profile 703-*a*/703-*b*/703-*c* of light received by a far-field detector when the output surface 344 of the optical extractor 340 of the light guide luminaire module 301 of the illumination device SL300 is respectively non-diffusive, diffusive based on diffusive film MPR05 and diffusive based on diffusive film MPR10. Each of the intensity profiles 703-*a*, 703-*b*, 703-*c* correspond to lobe 145' of the light intensity distribution 195 shown in FIG. 1C. Here, light output by the illumination device SL300 has a prevalent direction of propagation that is tilted relative to the z-axis about 10° and a divergence of about 20°. As described above, the prevalent direction of propagation and the divergence of the light output by the illumination device SL300 is determined primarily by a combination of (i) respective optical powers of the first reflective surface 346, the second reflective surface 348, and the output surface 344 of the optical extractor 340, and (ii) arrangements of the first reflective surface, the second reflective surface, and the output surface relative to each other and to the light guide direction (here the z-axis). Note that the (y,z)-intensity profile 703-*a* is the least smooth when the output surface 344 of the optical extractor 340 of the light guide luminaire module 301 of the illumination device SL300 is non-diffusive, the (y,z)-intensity profile 703-*b* has intermediary smoothness when the output surface 344 of the optical extractor 340 of the light guide luminaire module 301 of the illumination device SL300 is diffusive based on diffusive film MPR05, and the (y,z)-intensity profile 703-*c* is the most smooth when the output surface 344 of the optical extractor 340 of the light guide luminaire module 301 of the illumination device SL300 is diffusive based on diffusive film MPR10.

FIG. 7A/7B/7C also shows an (x,z)-intensity profile 705-*a*/705-*b*/705-*c* of light received by the far-field detector when the output surface 344 of the optical extractor 340 of the light guide luminaire module 301 of the illumination device SL300 is respectively non-diffusive, diffusive based on diffusive film MPR05 and diffusive based on diffusive film MPR10. Note that the (x,z)-intensity profile 705-*a* when the output surface 344 of the optical extractor 340 of the light guide luminaire module 301 of the illumination device SL300 is non-diffusive is less smooth than the (y,z)-intensity profiles 705-*b* or 705-*c* when the output surface 344 of the optical extractor 340 of the light guide luminaire module 301 of the illumination device SL300 is diffusive based on diffusive film MPR05 or MPR10.

Experimental Results for Illumination Device SL5*x*300 with Two LEDs 310 Per Channel of the Optical Couplers 320

Figure 8C:
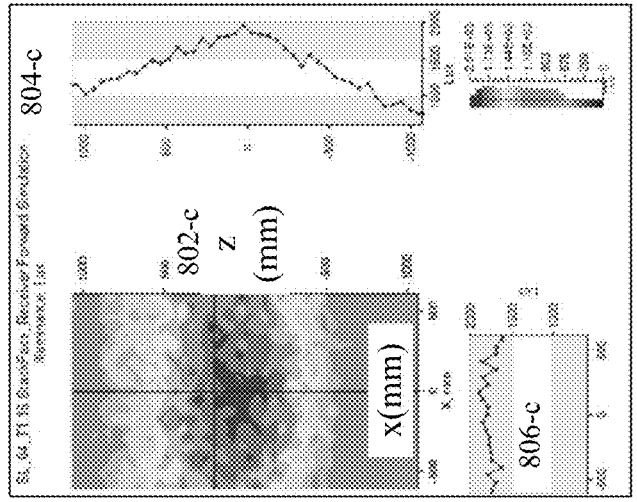
FIGS. 8A-8C, 9A-9C, 10A-10C, 11A-11C, 12B-12C and 13B-13C show results of simulation of the stack lighter luminaire from FIG. 4C.
Figure 8B:
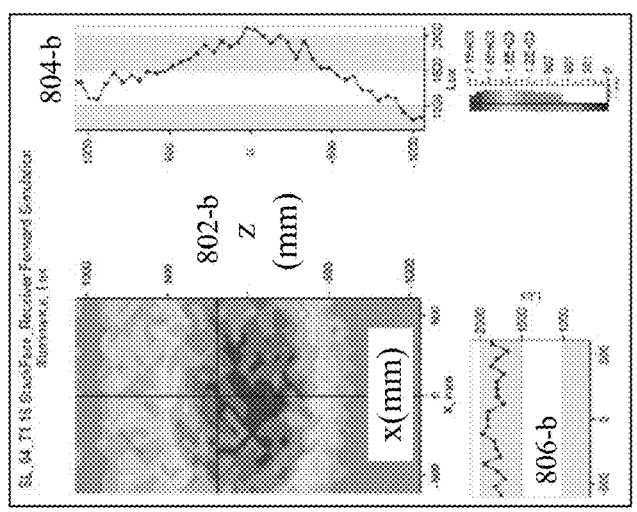
Figure 8A:
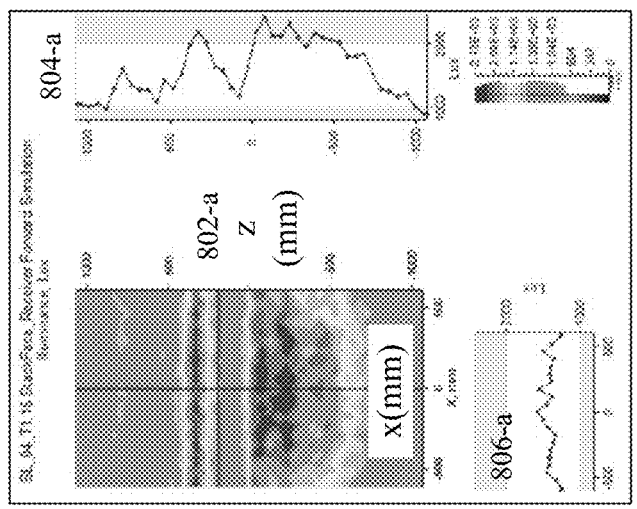

FIG. 8A/8B/8C shows an illuminance (x,z)-contour plot 802-*a*/802-*b*/802-*c* measured by Stack Detector 2 (see Table 6) when the output surface 344 of the optical extractor 340 of each of the five light guide luminaire modules 301 of the illumination device SL5*x*300 is respectively non-diffusive, diffusive based on diffusive film MPR05 and diffusive based on diffusive film MPR10. FIG. 8A/8B/8C also shows a z-axis cross-section 804-*a*/804-*b*/804-*c* that represents vertical variation of the illuminance of the Stack Detector 2 through the center of the illumination device SL5*x*300, and an x-axis cross-section 806-*a*/806-*b*/806-*c* that represents horizontal variation of the illuminance of the Stack Detector 2 at half height. Theses experimental results indicate the vertical uniformity of the illumination provided by the illumination device SL5*x*300 as a function of the diffusive properties of the output surface 344 of the optical extractor 340 of each of the five light guide luminaire modules 301 with two LEDs 310 per channel of the optical couplers 320.

Figures 9A, 9B, 9C:
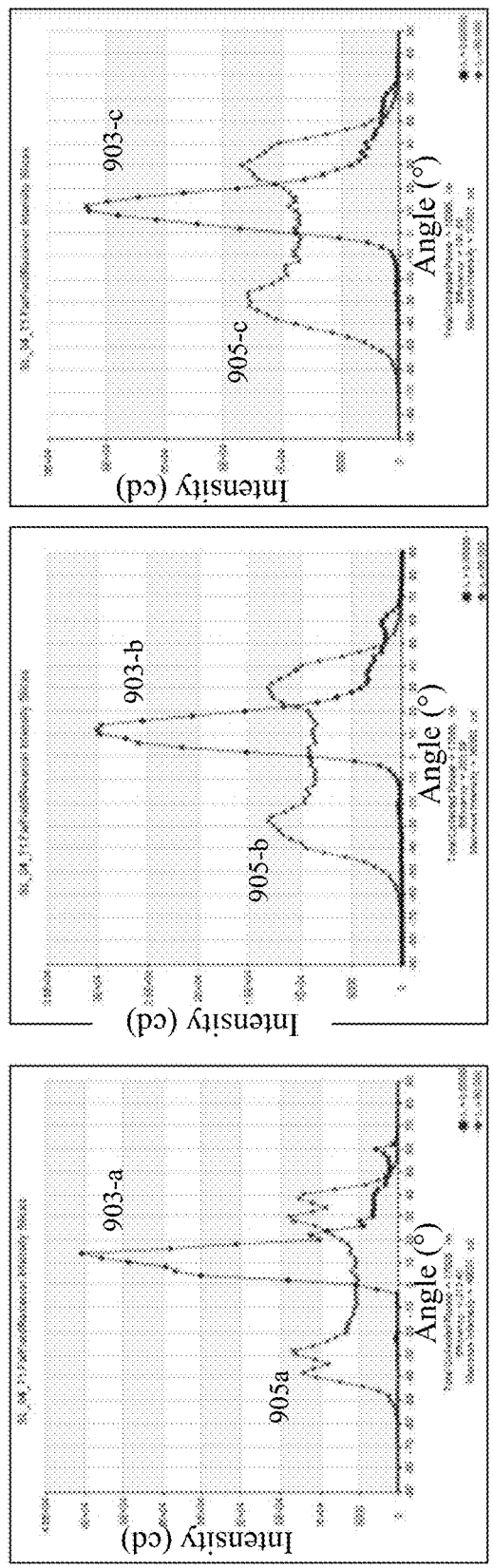

FIG. 9A/9B/9C shows an (y,z)-intensity profile 903-*a*/903-*b*/903-*c* of light received by a far-field detector when the output surface 344 of the optical extractor 340 of each of the five light guide luminaire modules 301 of the illumination device SL5*x*300 is respectively non-diffusive, diffusive based on diffusive film MPR05 and diffusive based on diffusive film MPR10. Each of the intensity profiles 903-*a*, 903-*b*, 903-*c* correspond to lobe 145' of the light intensity distribution 195 shown in FIG. 1C. Here, light output by the illumination device SL5*x*300 has a prevalent direction of propagation that is tilted relative to the z-axis about 10° and a divergence of about 20°. As described above, the prevalent direction of propagation and the divergence of the light output by the illumination device SL5*x*300 is determined primarily by a combination of (i) respective optical powers of the first reflective surface 346, the second reflective surface 348, and the output surface 344 of the optical extractor 340, and (ii) arrangements of the first reflective surface, the second reflective surface, and the output surface relative to each other and to the light guide direction (here the z-axis). Note that the (y,z)-intensity profile 903-*a* is the least smooth when the output surface 344 of the optical extractor 340 of each of the five light guide luminaire modules 301 of the illumination device SL5*x*300 is non-diffusive, the (y,z)-intensity profile 903-*b* has intermediary smoothness when the output surface 344 of the optical extractor 340 of each of the five light guide luminaire modules 301 of the illumination device SL5*x*300 is diffusive based on diffusive film MPR05, and the (y,z)-intensity profile 903-*c* is the most smooth when the output surface 344 of the optical extractor 340 of each of the five light guide luminaire modules 301 of the illumination device SL5*x*300 is diffusive based on diffusive film MPR10.

FIG. 9A/9B/9C also shows an (x,z)-intensity profile 905-*a*/905-*b*/905-*c* of light received by the far-field detector when the output surface 344 of the optical extractor 340 of each of the five light guide luminaire modules 301 of the illumination device SL5*x*300 is respectively non-diffusive, diffusive based on diffusive film MPR05 and diffusive based on diffusive film MPR10. Note that the (x,z)-intensity profile 905-*a* when the output surface 344 of the optical extractor 340 of each of the five light guide luminaire modules 301 of the illumination device SL5*x*300 is non-diffusive is less smooth than the (y,z)-intensity profiles 905-*b* or 905-*c* when the output surface 344 of the optical extractor 340 of each of the five light guide luminaire modules 301 of the illumination device SL5*x*300 is diffusive based on diffusive film MPR05 or MPR10.

Experimental Results for Illumination Device SL5*x*300 with One LED 310 Per Channel of the Optical Couplers 320

Figure 10C:
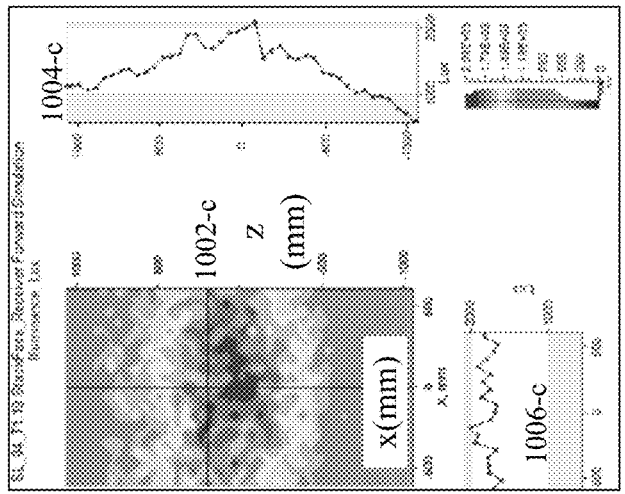
Figure 10B:
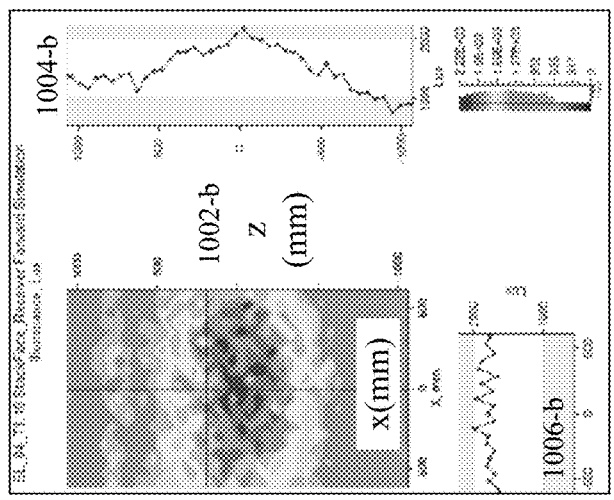
Figure 10A:
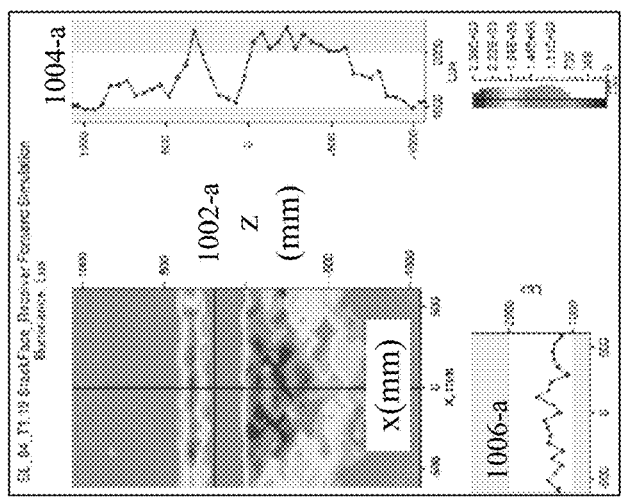

FIG. 10A/10B/10C shows an illuminance (x,z)-contour plot 1002-*a*/1002-*b*/1002-*c* measured by Stack Detector 2 (see Table 6) when the output surface 344 of the optical extractor 340 of each of the five light guide luminaire modules 301 of this implementation of the illumination device SL5*x*300 is respectively non-diffusive, diffusive based on diffusive film MPR05 and diffusive based on diffusive film MPR10. FIG. 10A/8B/8C also shows a z-axis cross-section 1004-*a*/1004-*b*/1004-*c* that represents vertical variation of the illuminance of the Stack Detector 2 through the center of this implementation of the illumination device SL5*x*300, and an x-axis cross-section 1006-*a*/1006-*b*/1006-*c* that represents horizontal variation of the illuminance of the Stack Detector 2 at half height. Theses experimental results indicate the vertical uniformity of the illumination provided by this implementation of the illumination device SL5x300 as a function of the diffusive properties of the output surface 344 of the optical extractor 340 of each of the five light guide luminaire modules 301 with one LED 310 per channel of the optical couplers 320.

Figure 11C:
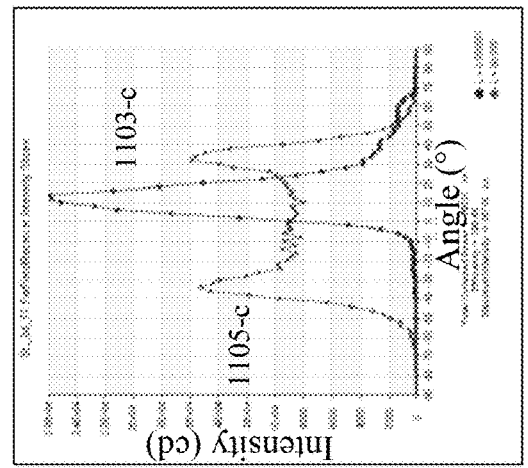
Figure 11B:
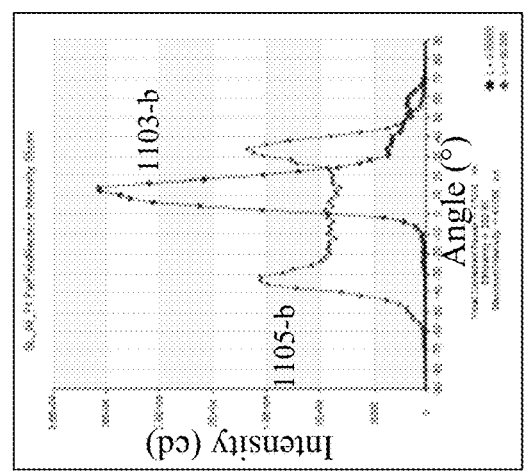
Figure 11A:
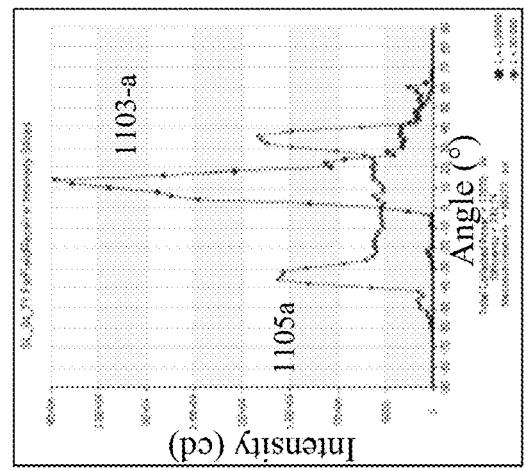

FIG. 11A/11B/11C shows an (y,z)-intensity profile 1103-$a$/1103-$b$/1103-$c$ of light received by a far-field detector when the output surface 344 of the optical extractor 340 of the optical extractor 340 of each of the five light guide luminaire modules 301 of this implementation of the illumination device SL5x300 is respectively non-diffusive, diffusive based on diffusive film MPR05 and diffusive based on diffusive film MPR10. Each of the intensity profiles 1103-$a$, 1103-$b$, 1103-$c$ correspond to lobe 145' of the light intensity distribution 195 shown in FIG. 1C. Here, light output by this implementation of the illumination device SL5x300 has a prevalent direction of propagation that is tilted relative to the z-axis about 10° and a divergence of about 20°. As described above, the prevalent direction of propagation and the divergence of the light output by this implementation of the illumination device SL5x300 is determined primarily by a combination of (i) respective optical powers of the first reflective surface 346, the second reflective surface 348, and the output surface 344 of the optical extractor 340, and (ii) arrangements of the first reflective surface, the second reflective surface, and the output surface relative to each other and to the light guide direction (here the z-axis). Note that the (y,z)-intensity profile 1103-$a$ is the least smooth when the output surface 344 of the optical extractor 340 of each of the five light guide luminaire modules 301 of this implementation of the illumination device SL5x300 is non-diffusive, the (y,z)-intensity profile 1103-$b$ has intermediary smoothness when the output surface 344 of the optical extractor 340 of each of the five light guide luminaire modules 301 of this implementation of the illumination device SL5x300 is diffusive based on diffusive film MPR05, and the (y,z)-intensity profile 1103-$c$ is the most smooth when the output surface 344 of the optical extractor 340 of each of the five light guide luminaire modules 301 of this implementation of the illumination device SL5x300 is diffusive based on diffusive film MPR10.

FIG. 11A/11B/11C also shows an (x,z)-intensity profile 1105-$a$/1105-$b$/1105-$c$ of light received by the far-field detector when the output surface 344 of the optical extractor 340 of each of the five light guide luminaire modules 301 of this implementation of the illumination device SL5x300 is respectively non-diffusive, diffusive based on diffusive film MPR05 and diffusive based on diffusive film MPR10. Note that the (x,z)-intensity profile 1105-$a$ when the output surface 344 of the optical extractor 340 of each of the five light guide luminaire modules 301 of this implementation of the illumination device SL5x300 is non-diffusive is less smooth than the (y,z)-intensity profiles 1105-$b$ or 1105-$c$ when the output surface 344 of the optical extractor 340 of each of the five light guide luminaire modules 301 of this implementation of the illumination device SL5x300 is diffusive based on diffusive film MPR05 or MPR10.

Additional Experimental Results

Figures 12A, 12B, 12C:
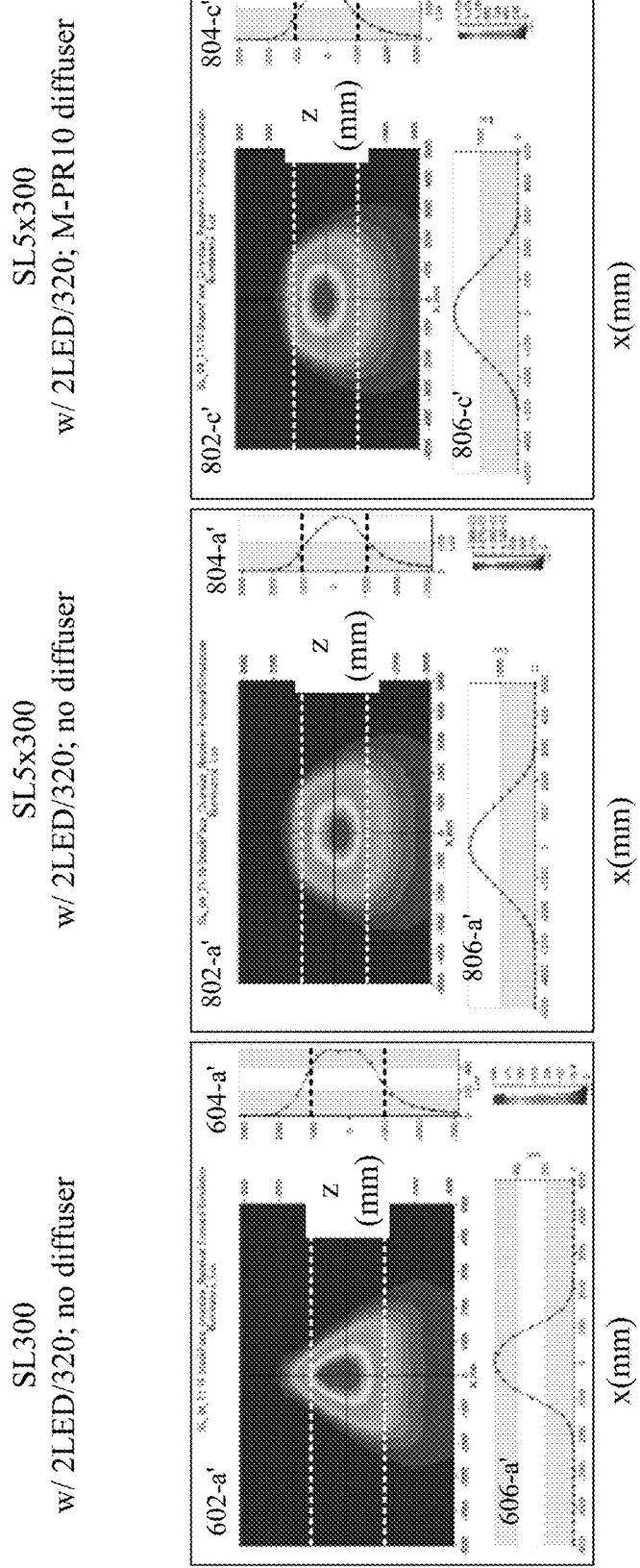

FIG. 12A shows an illuminance (x,z)-contour plot 602-$a'$ measured by Stack Detector 4 (see Table 6) when the output surface 344 of the optical extractor 340 of the light guide luminaire module 301 of the illumination device SL300 is non-diffusive. Here, the dashed lines overlapping the illuminance (x,z)-contour plot 602-$a'$ indicate the bottom and top edges of the stack 190. The triangular shape of the bright portion of the illuminance (x,z)-contour plot 602-$a'$ is a result of the intensity distribution along the length L (along the x-axis) of the light guide luminaire module 301. FIG. 12A also shows a z-axis cross-section 604-$a'$ that represents vertical variation of the illuminance of the Stack Detector 4 through the center of the illumination device SL300, and an x-axis cross-section 606-$a'$ that represents horizontal variation of the illuminance of the Stack Detector 4 at half height. Once again, the dashed lines overlapping the z-axis cross-section 604-$a'$ indicate the bottom and top edges of the stack 190.

FIG. 12B/12C shows an illuminance (x,z)-contour plot 802-$a'$/802-$c'$ measured by Stack Detector 4 (see Table 6) when the output surface 344 of the optical extractor 340 of each of the five light guide luminaire modules 301 of the illumination device SL5x300 is respectively non-diffusive and diffusive based on diffusive film MPR10. Here, the dashed lines overlapping the illuminance (x,z)-contour plot 802-$a'$/802-$c'$ indicate the bottom and top edges of the stack 190. Note that the bright portion of the illuminance (x,z)-contour plot 802-$a'$/802-$c'$ shown in FIG. 12B/12C has less of a triangular shape and more of a trapezoidal shape relative to corresponding illuminance (x,z)-contour plot 602-$a'$ of the illumination device SL300 shown in FIG. 12A. FIG. 12B/12C also shows a z-axis cross-section 804-$a'$/804-$c'$ that represents vertical variation of the illuminance of the Stack Detector 4 through the center of the illumination device SL5x300, and an x-axis cross-section 806-$a'$/806-$c'$ that represents horizontal variation of the illuminance of the Stack Detector 4 at half height. Once again, the dashed lines overlapping the z-axis cross-section 804-$a'$/804-$c'$ indicate the bottom and top edges of the stack 190. Theses experimental results indicate the vertical uniformity of the illumination provided by the illumination device SL5x300 as a function of the diffusive properties of the output surface 344 of the optical extractor 340 of each of the five light guide luminaire modules 301 with two LEDs 310 per channel of the optical couplers 320.

Figures 13A, 13B, 13C:
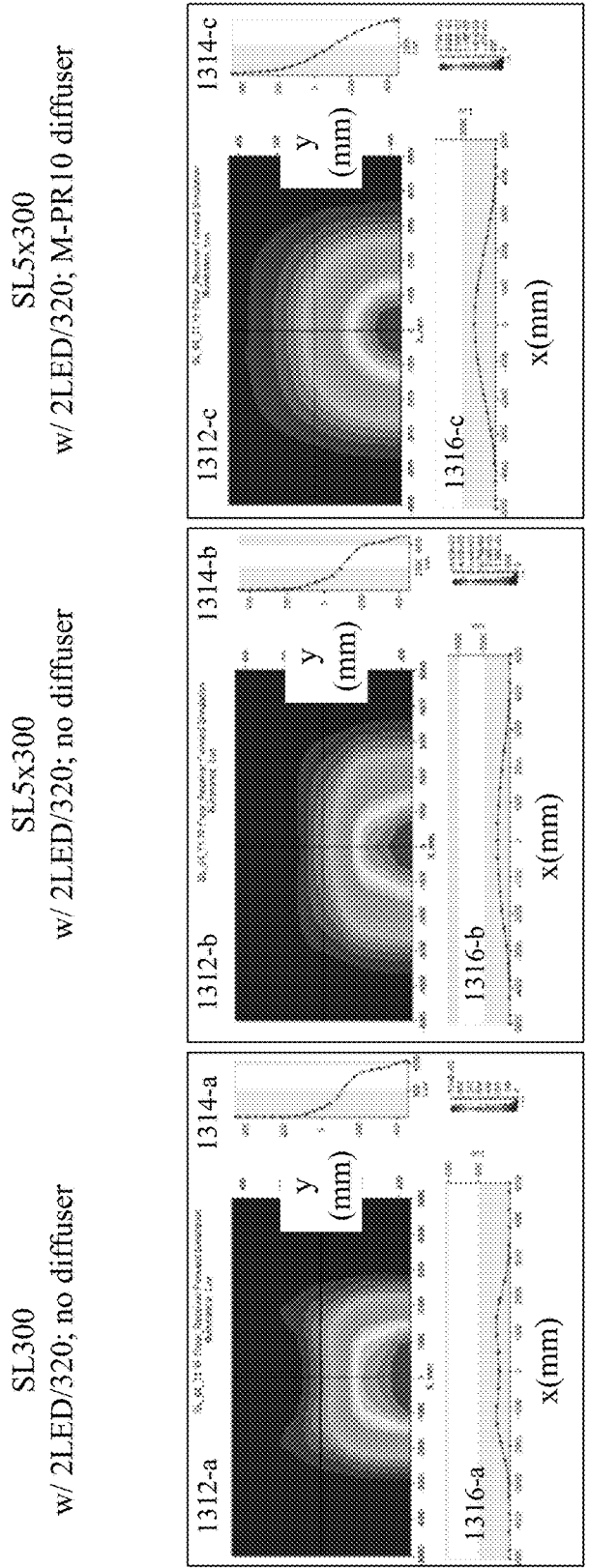

FIG. 13A shows an illuminance (x,y)-contour plot 1312-$a$ measured by the Floor Detector (see Table 6) when the output surface 344 of the optical extractor 340 of the light guide luminaire module 301 of the illumination device SL300 is non-diffusive. FIG. 13B/13C shows an illuminance (x,y)-contour plot 1312-$b$/1312-$c$ measured by the Floor Detector when the output surface 344 of the optical extractor 340 of each of the five light guide luminaire modules 301 of the illumination device SL5x300 is respectively non-diffusive and diffusive based on diffusive film MPR10. Note that the scales along the x-axis and y-axis are different from each other in each of the illuminance (x,y)-contour plots 1312-$a$, 1312-$b$, 1312-$c$. FIG. 13A/13B/13C also shows a y-axis cross-section 1314-$a$/1314-$b$/1314-$c$ that represents variation of the illuminance of the Stack Detector 4 through the center of the illumination device SL300/SL3x500/SL3x500 and orthogonally to the stack 190, and an x-axis cross-section 1316-$a$/1316-$b$/1316-$c$ that represents horizontal variation of the illuminance of the Stack Detector 4 at half height and parallel to the stack. Here, y=0 corresponds to a vertical plane that crosses the output surface 344 of the optical coupler 340 of the light guide luminaire module 301 of the illumination device SL300 or of each of the five light guide luminaire modules 301 of the illumination device SL5x300. As such, in the coordinate system x-y, the stack is located at y=d=−18"(or −457.2 mm) in the illuminance (x,y)-contour plot 1312-a/1312-b/1312-c.

By comparing the results shown in FIG. 12A and FIG. 13A, one notes that the peak floor illuminance in the illuminance (x,y)-contour plot 1312-a measured by the Floor Detector exceeds that of the stack illuminance in the illuminance (x,y)-contour plot 602-a' measured by the Stack Detector 4. This is due to the fact that a prevalent direction of propagation of the light output by the illumination device SL300 has a small tilt, of about 10° relative the z-axis (as shown by profile 703-a in FIG. 7A), resulting in high illuminance levels at the base of the stack. The same is true for the illumination device SL5x300: by comparing the results shown in FIG. 12B/12C and FIG. 13B/13C, one notes that the peak floor illuminance in the illuminance (x,y)-contour plot 1312-b/1312c measured by the Floor Detector exceeds that of the stack illuminance in the illuminance (x,y)-contour plot 802-a'/802-c' measured by the Stack Detector 4. Once again, this is due to the fact that a prevalent direction of propagation of the light output by the illumination device SL5x300 has a small tilt, of about 10° relative the z-axis (as shown by profile 903-b/903-c in FIG. 9A/9C), resulting in high illuminance levels at the base of the stack.

Some components of light guide luminaire modules 301 used in the illumination devices SL300, SL3x300 and SL5x300 are described below.

(v) Components of Light Guide Luminaire Modules

Referring again to FIGS. 3A-3B, a light guide luminaire module 301 includes a substrate 305 having a plurality of LEEs 310 distributed along a first surface of the substrate 305. The substrate 305 with the LEEs 310 is disposed at a first (e.g., upper) edge of a light guide 330. Sections through the light guide luminaire module 301 parallel to the y-z plane are referred to as the "cross-section" or "cross-sectional plane" of the light guide luminaire module. Also, light guide luminaire module 301 extends along the x-direction, so this direction is referred to as the "longitudinal" direction of the light guide luminaire module. Implementations of the light guide luminaire module 301 can have a plane of symmetry parallel to the x-z plane, be curved or otherwise shaped. This is referred to as the "symmetry plane" of the luminaire module.

Multiple LEEs 310 are disposed on the first surface of the substrate 305. For example, the plurality of LEEs 310 can include multiple white LEDs. In the example illustrated in FIG. 3B, the LEEs 310 are optically coupled with one or more optical couplers 320. An optical extractor 340 is disposed at second (e.g., lower) edge of light guide 330.

Substrate 305, light guide 330, and optical extractor 340 extend a length L along the x-direction, so that the light guide luminaire module 301 is an elongated luminaire module with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 310 on the substrate 305 will generally depend, inter alia, on the length L, where more LEEs are used for longer luminaire modules. In some implementations, the plurality of LEEs 310 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some implementations, the light guide luminaire module 301 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the light guide luminaire module 301. In some implementations, a heat-sink can be attached to the substrate 305 to extract heat emitted by the plurality of LEEs 310. The heat-sink can be disposed on a surface of the substrate 305 opposing the side of the substrate 305 on which the LEEs 310 are disposed. The light guide luminaire module 301 can include one or multiple types of LEEs, for example one or more subsets of LEEs in which each subset can have different color or color temperature.

Optical coupler 320 includes one or more solid pieces of transparent optical material (e.g., a glass material or a transparent plastic, such as polycarbonate or acrylic) having side surfaces positioned to reflect light from the LEEs 310 towards the light guide 330. In general, side surfaces are shaped to collect and at least partially collimate light emitted from the LEEs. In the y-z cross-sectional plane, side surfaces can be straight or curved. Examples of curved surfaces include surfaces having a constant radius of curvature, parabolic or hyperbolic shapes. In some implementations, side surfaces are coated with a highly reflective material (e.g., a reflective metal, such as aluminum or silver), to provide a highly reflective optical interface. The cross-sectional profile of optical coupler 320 can be uniform along the length L of light guide luminaire module 301. Alternatively, the cross-sectional profile can vary. For example, side surfaces can be curved out of the y-z plane. Depending on the illumination application, mitigation of glare from the output light within the x-z plane can be important. As such the optical couplers 320 may be configured to provide respective optical power with the x-z plane.

The exit aperture of the optical coupler 320 adjacent the upper edge of the light guide is optically coupled to edge to facilitate efficient coupling of light from the optical coupler 320 into light guide 330. For example, the surfaces of a solid coupler and a solid light guide can be attached using a material that substantially matches the refractive index of the material forming the optical coupler 320 or light guide 330 or both (e.g., refractive indices across the interface are different by 2% or less.) The optical coupler 320 can be affixed to light guide 330 using an index matching fluid, grease, or adhesive. In some implementations, optical coupler 320 is fused to light guide 330 or they are integrally formed from a single piece of material (e.g., coupler and light guide may be monolithic and may be made of a solid transparent optical material).

Light guide 330 is formed from a piece of transparent material (e.g., glass material such as BK7, fused silica or quartz glass, or a transparent plastic, such as polycarbonate or acrylic) that can be the same or different from the material forming optical couplers 320. Light guide 330 extends length L in the x-direction, has a uniform thickness T in the y-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 330 from optical coupler 320 (with an angular range 125) reflects off the planar surfaces of the light guide by TIR and spatially mixes within the light guide. The mixing can help achieve illuminance and/or color uniformity, along the y-axis, at the distal portion of the light guide at the optical extractor 340. The depth, D, of light guide 330 can be selected to achieve adequate uniformity at the exit aperture of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 320 are designed to restrict the angular range of light entering the light guide 330 (e.g., to within +/−40 degrees) so that at least a substantial amount of the light (e.g., 95% or more of the light) is optically coupled into spatial modes in the light guide 330 that undergoes TIR at the planar surfaces. Light guide 330 can have a uniform thickness T, which is the distance separating two planar opposing surfaces of the light guide. Generally, T is sufficiently large so the light guide has an aperture at first (e.g., upper) surface sufficiently large to approximately match (or exceed) the exit aperture of optical coupler 320. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 320 and light guide 330 are formed from solid pieces of transparent optical material, hollow structures are also possible. For example, the optical coupler 320 or the light guide 330 or both may be hollow with reflective inner surfaces rather than being solid. As such, material cost can be reduced and absorption in the light guide can be mitigated. A number of specular reflective materials may be suitable for this purpose including materials such as 3M Vikuiti™ or Miro IV™ sheet from Alanod Corporation where greater than 90% of the incident light can be efficiently guided to the optical extractor.

The optical extractor of the light guide luminaire module 301 can be implemented as the light shaping optical article described in detail above, in connection with FIGS. 1A-1B and 2A-2F.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. A luminaire module comprising:
    a plurality of light-emitting elements (LEEs) arranged to emit light in a forward direction;
    a light guide comprising a pair of opposing side surfaces extending from a receiving end of the light guide to an opposing end of the light guide, the light guide configured to guide light received at the receiving end from the LEEs in the forward direction to the opposing end, wherein the light guide is elongated along a transverse direction orthogonal to the forward direction; and
    an optical extractor elongated along the transverse direction and located at the opposing end of the light guide to receive the guided light, the optical extractor comprising a redirecting surface and an output surface, wherein the received light undergoes two reflections off the redirecting surface prior to being output through the output surface in an ambient environment as output light in a backward angular range,
    wherein the redirecting surface and the output surface are shaped and arranged such that the luminaire module provides illumination on a target surface that is laterally spaced-apart from the optical extractor and is encompassed by the backward angular range, and
    wherein a ratio of maximum illumination to minimum illumination on the target surface over 1 m along the dimension of the target surface parallel to the forward direction is at most 4:1.

2. The luminaire module of claim 1, wherein
    the output surface is convex, and
    the redirecting surface of the optical extractor comprises a first reflective surface where the light received by the optical extractor undergoes a first of the two reflections and a second reflective surface where the light that underwent the first of the two reflections undergoes a second of the two reflections.

3. The luminaire module of claim 2, wherein the output surface is a diffusive surface.

4. The luminaire module of claim 2, wherein the first reflective surface is convex.

5. The luminaire module of claim 2, wherein the first reflective surface is flat.

6. The luminaire module of claim 1, wherein the optical extractor is formed from a first solid material.

7. The luminaire module of claim 6, wherein the light guide is formed from a second solid material.

8. A luminaire module comprising:
    a plurality of light-emitting elements (LEEs) arranged to emit light in a forward direction;
    a light guide comprising a pair of opposing side surfaces extending from a receiving end of the light guide to an opposing end of the light guide, the light guide configured to guide light received at the receiving end from the LEEs in the forward direction to the opposing end, wherein the light guide is elongated along a transverse direction orthogonal to the forward direction; and
    an optical extractor elongated along the transverse direction and located at the opposing end of the light guide to receive the guided light, the optical extractor comprising a redirecting surface and an output surface, wherein the received light undergoes two reflections off the redirecting surface prior to being output through the output surface in an ambient environment as output light in a backward angular range,
    wherein the redirecting surface and the output surface are shaped and arranged such that the luminaire module provides illumination on a target surface that is laterally spaced-apart from the optical extractor and is encompassed by the backward angular range, and wherein a ratio of maximum illumination to minimum illumination on the target surface over 2 m along the dimension of the target surface parallel to the forward direction is at most 10:1.

9. The luminaire module of claim 8, wherein the redirecting surface and the output surface are shaped and arranged such that a prevalent direction of light propagation within the backward angular range has a component antiparallel to the forward direction and a component orthogonal to the forward direction.

10. The luminaire module of claim 8 further comprising one or more optical couplers, wherein
the light provided by the LEEs is in a first angular range,
the optical couplers are arranged to receive the light provided by the LEEs and redirect it to the receiving end of the light guide in a second angular range, and
a numerical aperture of the light guide is such that the light received from the optical couplers in the second angular range can be guided by the light guide through TIR off the pair of opposing side surfaces.

11. The luminaire module of claim 8, wherein the LEEs are LEDs that emit white light.

12. The luminaire module of claim 8 is elongated along a direction orthogonal to the forward direction.

13. The luminaire module of claim 8 has a toroidal shape about an axis parallel to the forward direction.

14. An illumination device comprising one or more luminaire modules as defined in claim 8 and configured to operate as a stack lighter luminaire.

15. An illumination device comprising one or more luminaire modules as defined in claim 8 and configured to operate as a wall wash luminaire.

16. The luminaire module of claim 8, wherein
the output surface is convex, and
the redirecting surface of the optical extractor comprises a first reflective surface where the light received by the optical extractor undergoes a first of the two reflections and a second reflective surface where the light that underwent the first of the two reflections undergoes a second of the two reflections.

17. The luminaire module of claim 16, wherein the output surface is a diffusive surface.

18. The luminaire module of claim 16, wherein the first reflective surface is convex.

19. The luminaire module of claim 16, wherein the first reflective surface is flat.

20. The luminaire module of claim 8, wherein the optical extractor is formed from a first solid material.

21. The luminaire module of claim 20, wherein the light guide is formed from a second solid material.

22. The luminaire module of claim 1, wherein the redirecting surface and the output surface are shaped and arranged such that a prevalent direction of light propagation within the backward angular range has a component antiparallel to the forward direction and a component orthogonal to the forward direction.

23. The luminaire module of claim 1 further comprising one or more optical couplers, wherein
the light provided by the LEEs is in a first angular range,
the optical couplers are arranged to receive the light provided by the LEEs and redirect it to the receiving end of the light guide in a second angular range, and
a numerical aperture of the light guide is such that the light received from the optical couplers in the second angular range can be guided by the light guide through TIR off the pair of opposing side surfaces.

24. The luminaire module of claim 1, wherein the LEEs are LEDs that emit white light.

25. The luminaire module of claim 1 is elongated along a direction orthogonal to the forward direction.

26. The luminaire module of claim 1 has a toroidal shape about an axis parallel to the forward direction.

27. An illumination device comprising one or more luminaire modules as defined in claim 1 and configured to operate as a stack lighter luminaire.

28. An illumination device comprising one or more luminaire modules as defined in claim 1 and configured to operate as a wall wash luminaire.

* * * * *